US006697220B2

(12) United States Patent
Sasaki

(10) Patent No.: US 6,697,220 B2
(45) Date of Patent: Feb. 24, 2004

(54) THIN FILM MAGNETIC HEAD

(75) Inventor: Yoshitaka Sasaki, Tokyo (JP)

(73) Assignee: TDK Corporation, Tokyo (JP)

( * ) Notice: Subject to any disclaimer, the term of this patent is extended or adjusted under 35 U.S.C. 154(b) by 246 days.

(21) Appl. No.: 09/951,442

(22) Filed: Sep. 14, 2001

(65) Prior Publication Data
US 2002/0036864 A1 Mar. 28, 2002

(30) Foreign Application Priority Data
Sep. 19, 2000 (JP) .......................... 2000-284101

(51) Int. Cl.⁷ ............................................. G11B 5/147
(52) U.S. Cl. ....................................................... 360/126
(58) Field of Search ........................................ 360/126

(56) References Cited
U.S. PATENT DOCUMENTS
6,490,126 B1 * 12/2002 Sasaki ........................ 360/126
* cited by examiner Primary Examiner—A. J. Heinz
(74) Attorney, Agent, or Firm—Oliff & Berridge, PLC

(57) ABSTRACT

The invention provides a thin film magnetic head having a minute magnetic pole width and an excellent overwriting characteristic and a method of manufacturing thereof. A top magnetic layer includes a first magnetic pole tip and a second magnetic pole tip in order from a side further from the gap layer. A thin film coil is located in a rearward area specified by thickness of the first magnetic pole tip of the top magnetic layer. A thickness of the thin film coil can be determined suitably, and a required and sufficient quantity of a magnetic flux can be generated by energizing the thin film coil.

16 Claims, 27 Drawing Sheets

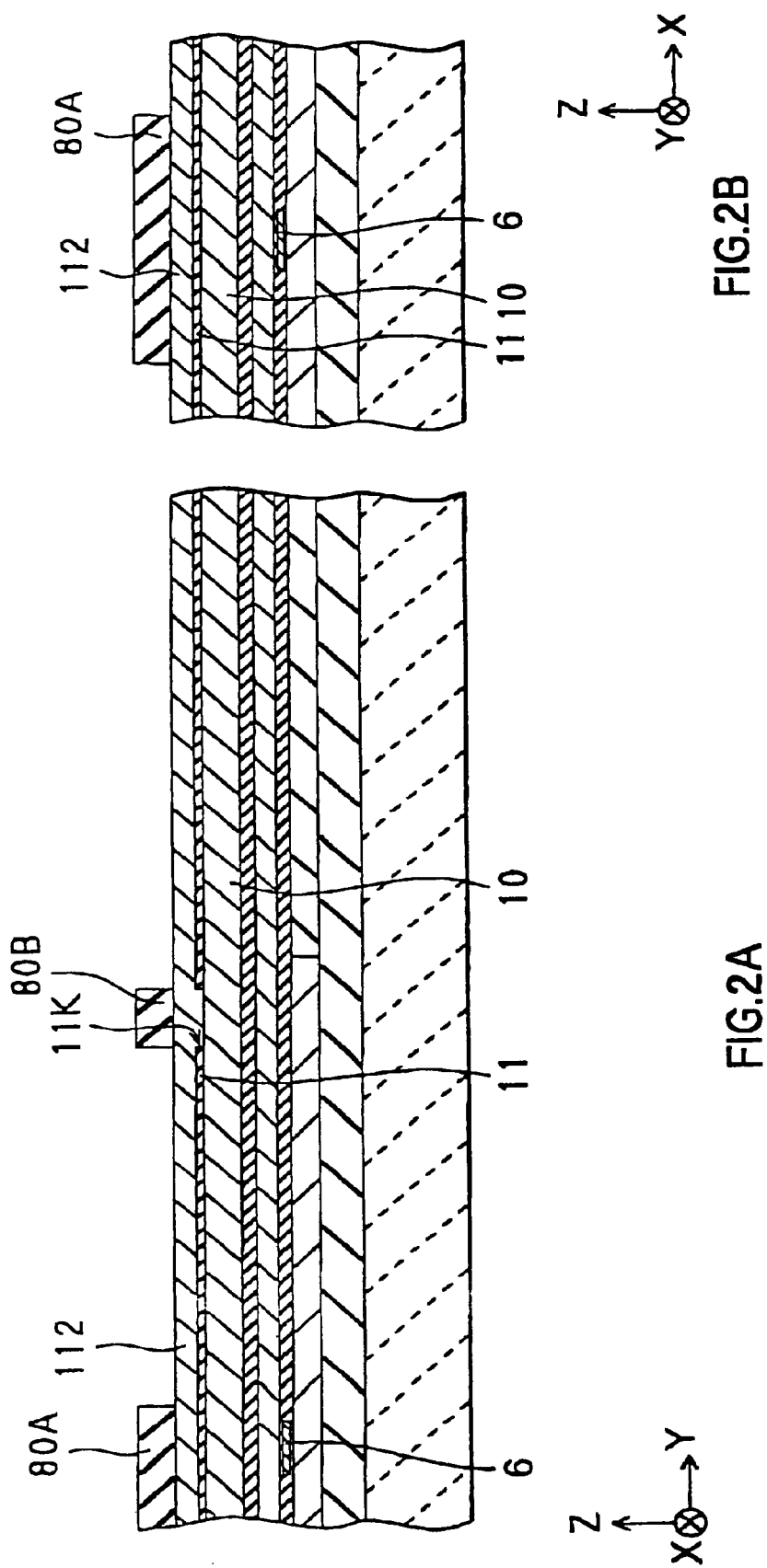

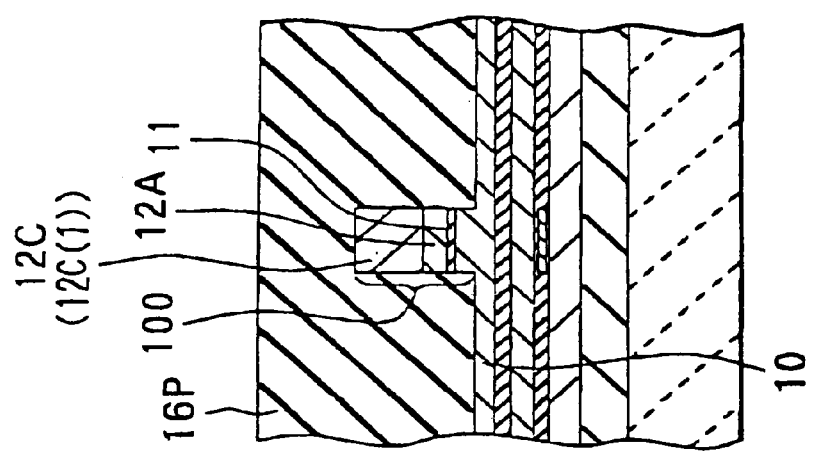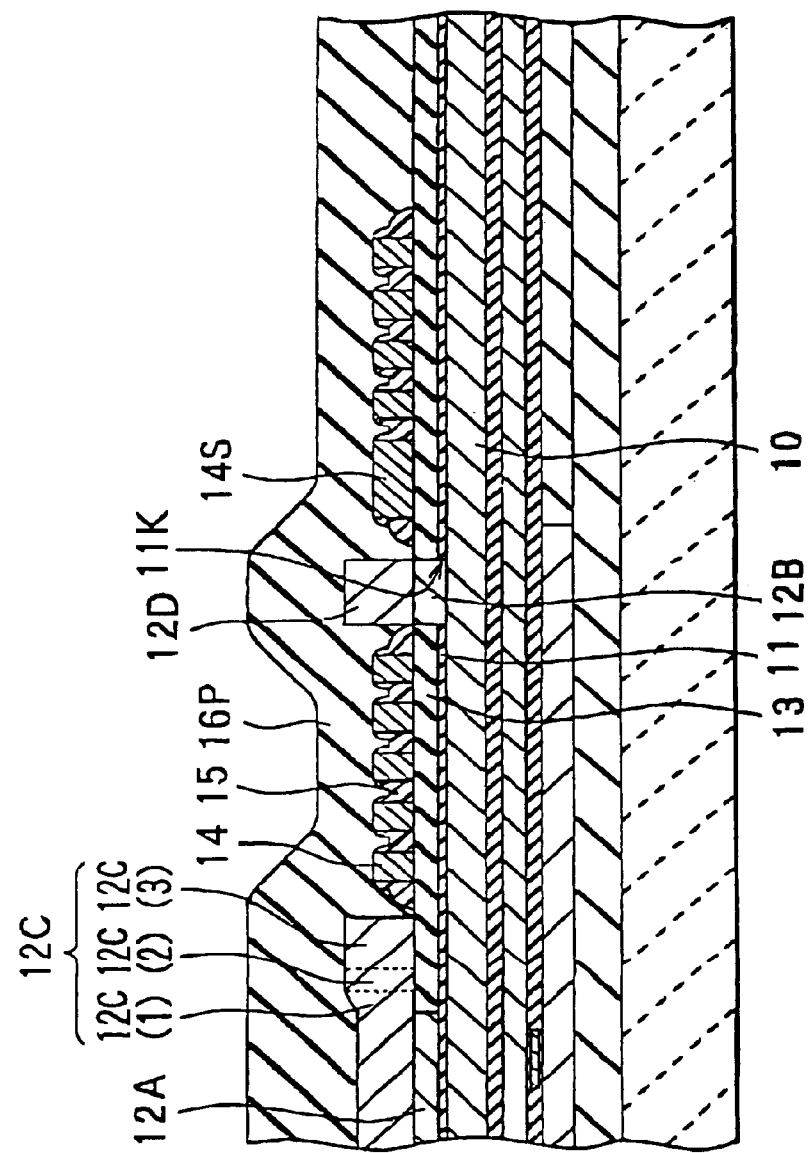

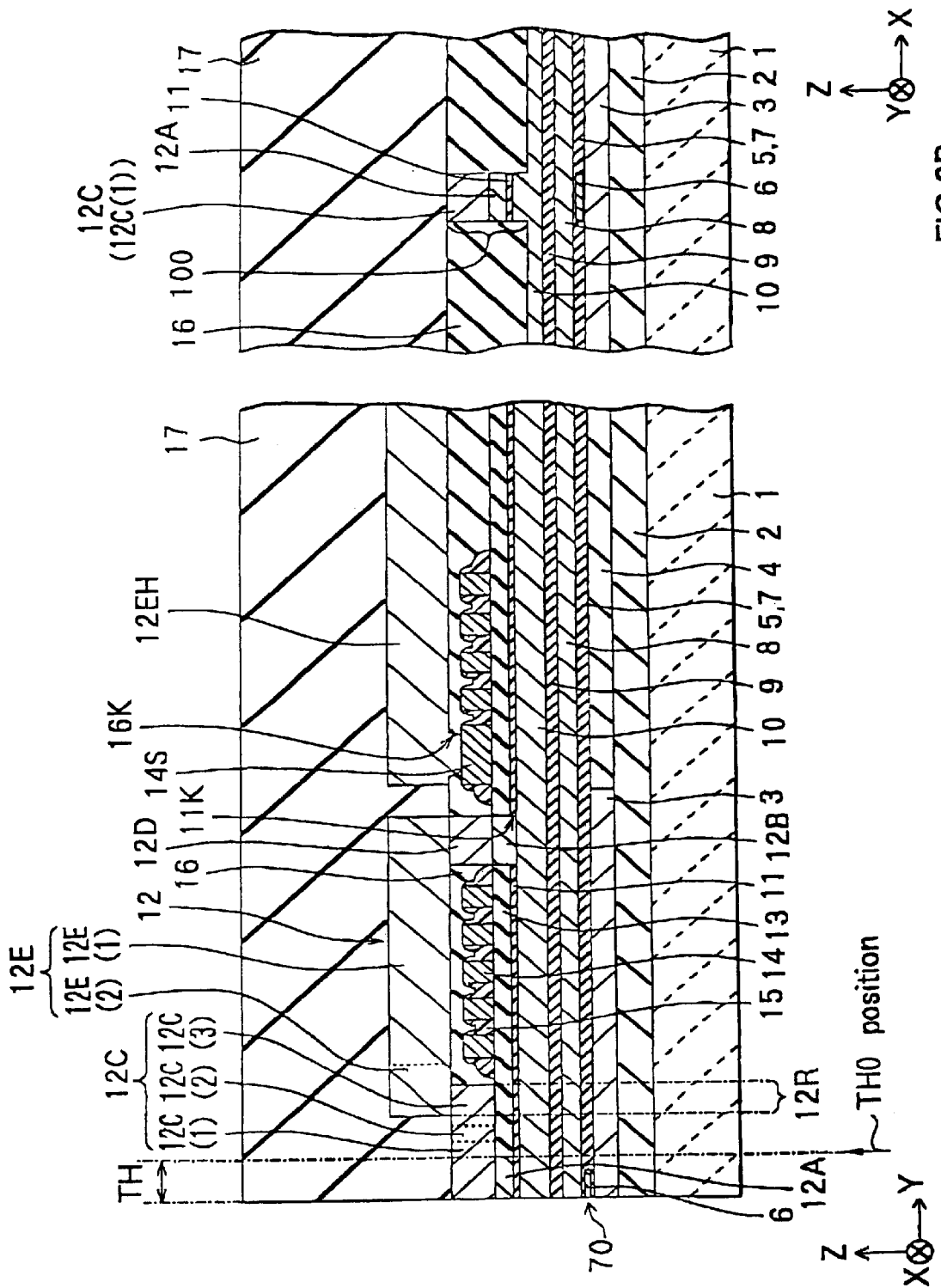

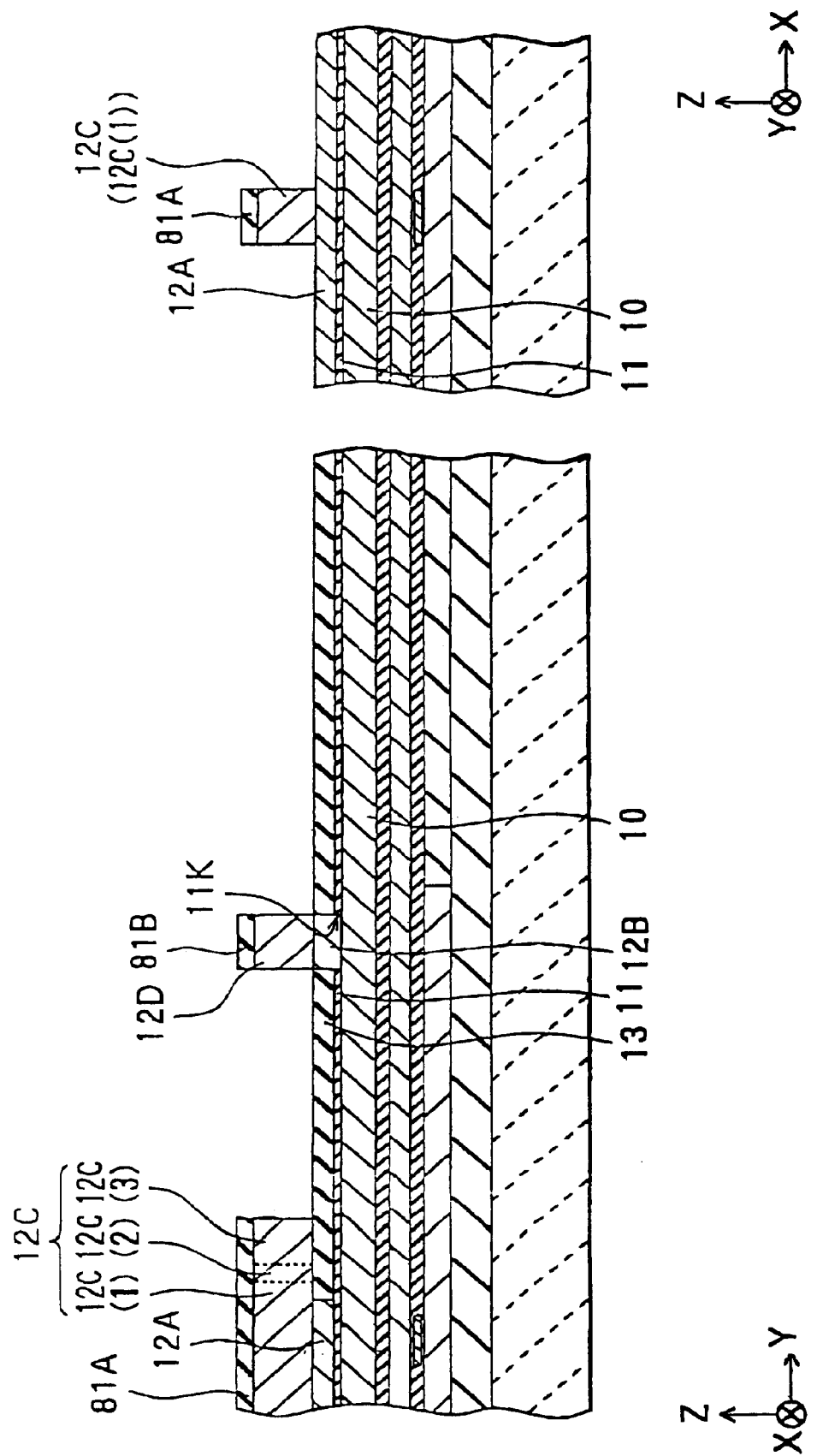

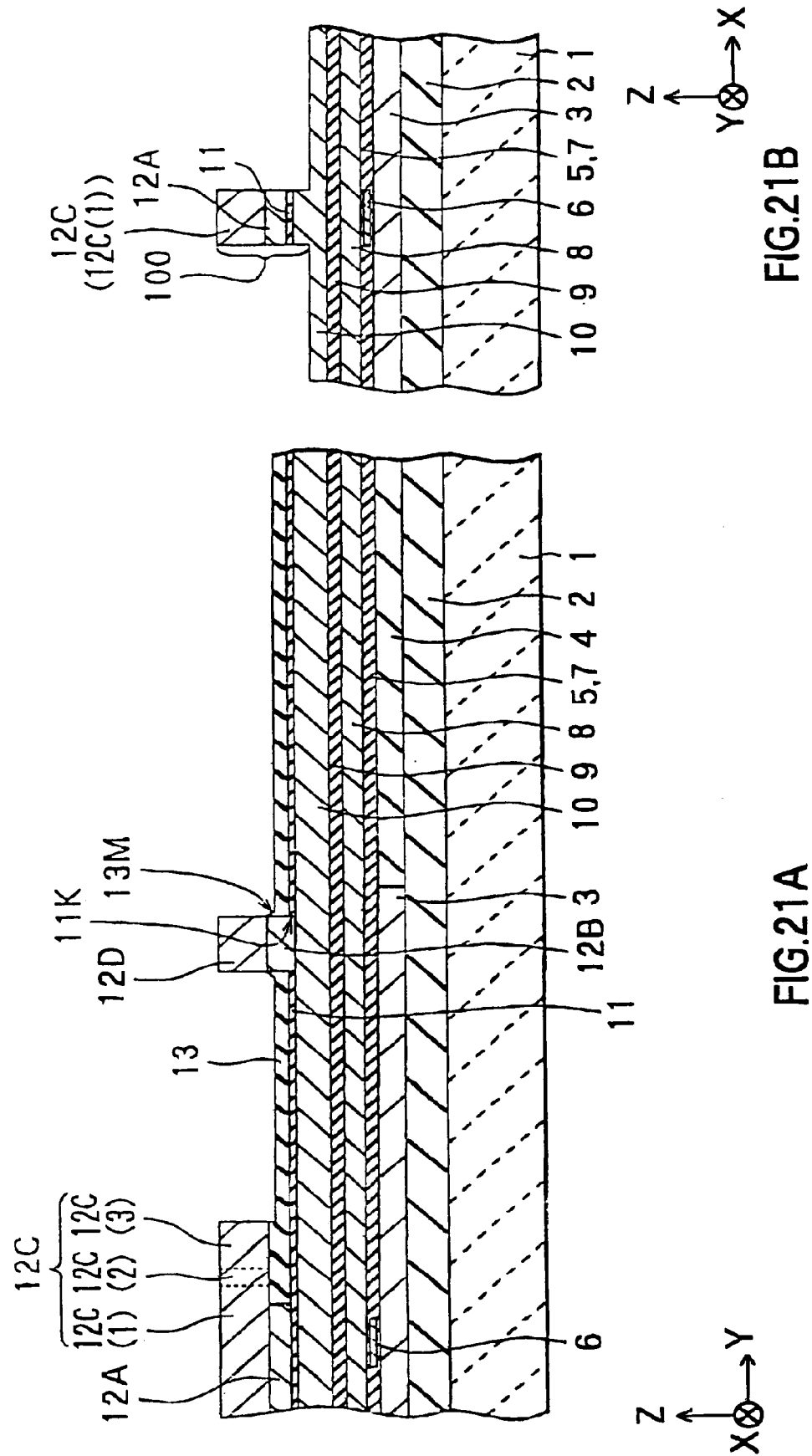

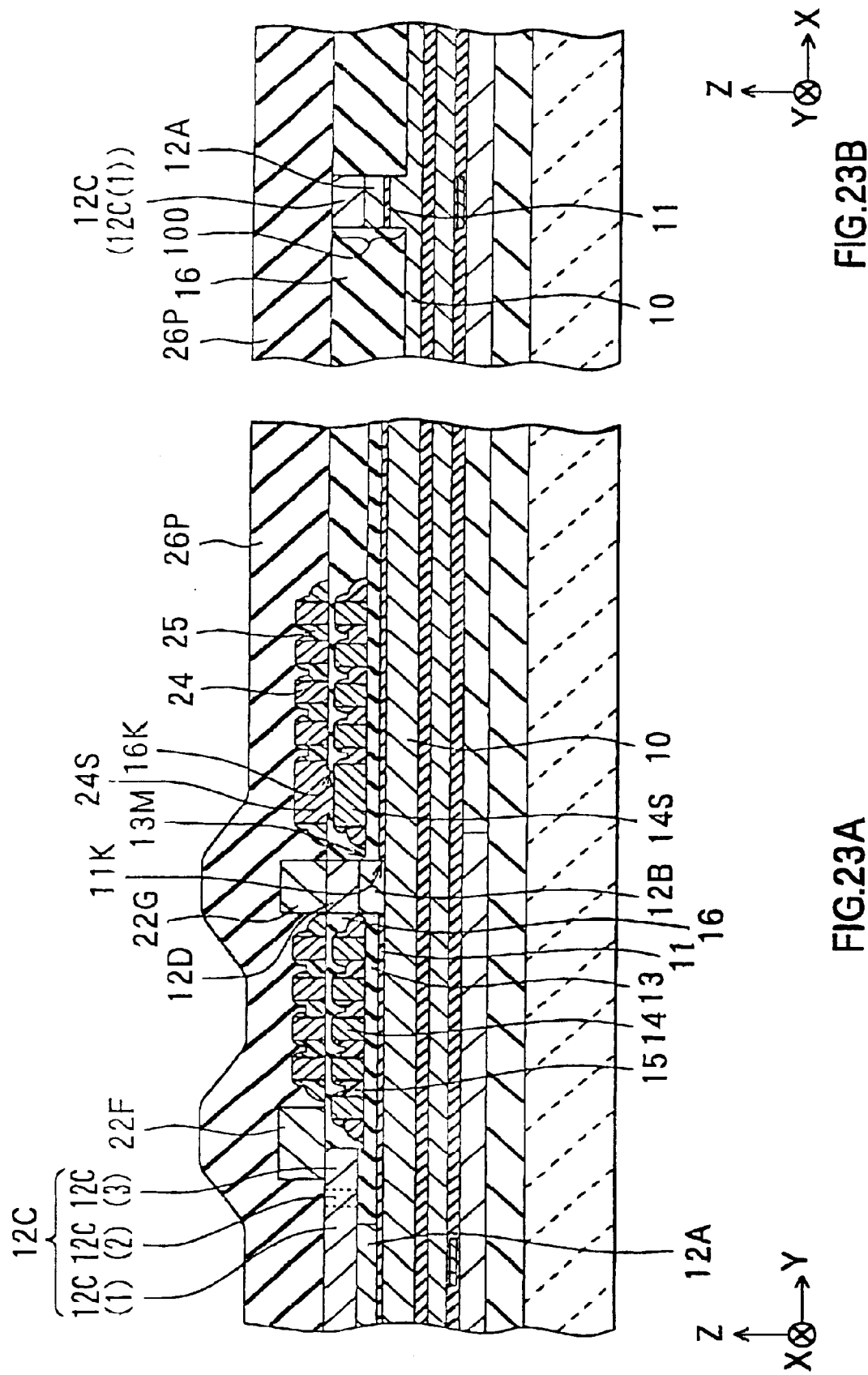

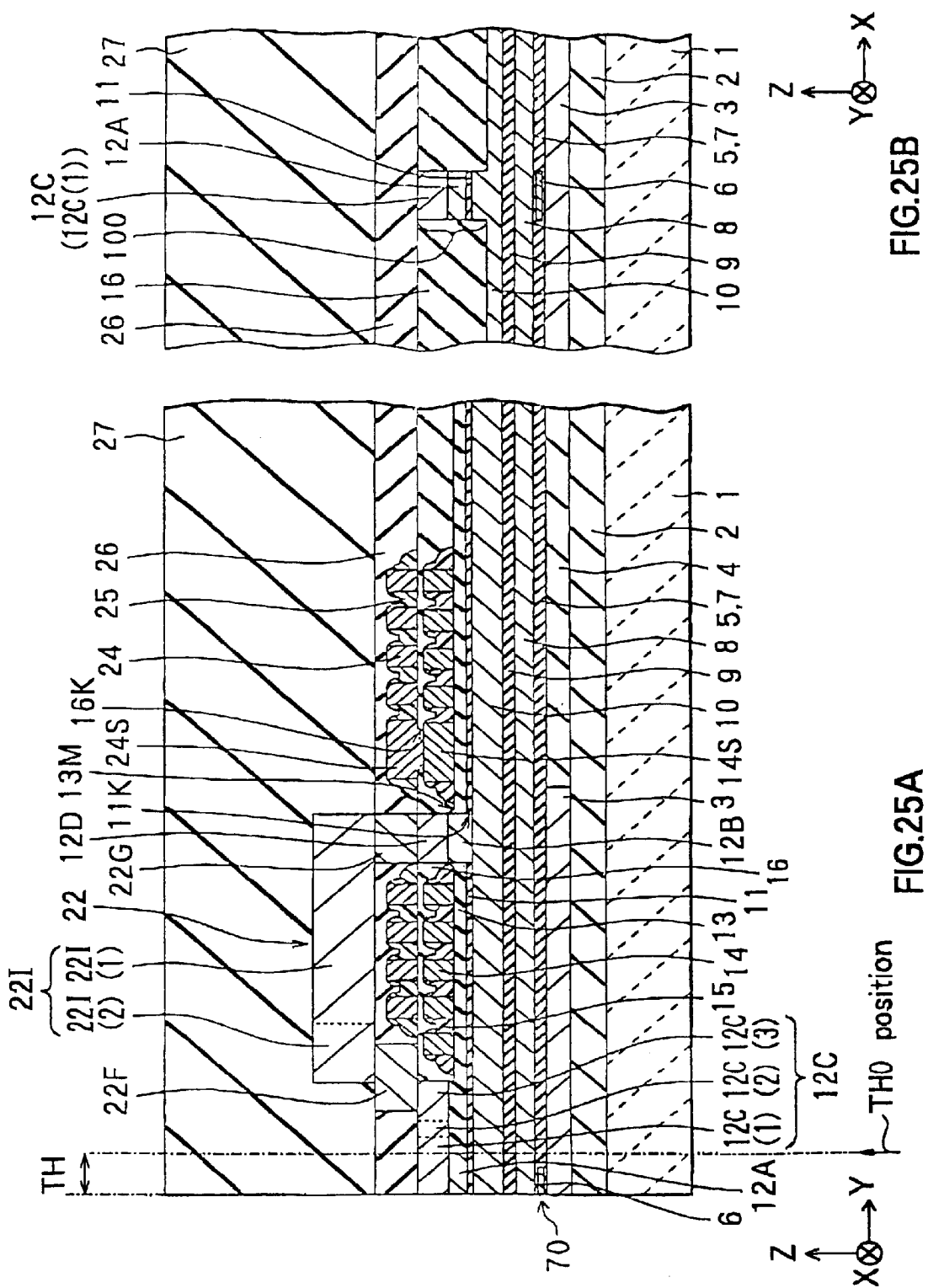

THIN FILM MAGNETIC HEAD

BACKGROUND OF THE INVENTION

1. Field of the Invention

The present invention relates to a thin film magnetic head having at least inductive magnetic transducer for writing and a method of manufacturing thereof.

2. Description of the Related Art

Recently, an improvement in performance of a thin film magnetic head has been sought in accordance with an increase in a surface recording density of a hard disk or the like. A composite thin film magnetic head, which has a stacked structure comprising a recording head having an inductive magnetic transducer and a reproducing head having a magnetoresistive (hereinafter referred to as MR) element that is a type of magnetic transducer, is widely used as the thin film magnetic head.

The recording head comprises, for example, a top magnetic pole (top pole) and a bottom magnetic pole (bottom pole) which are located respectively at the top side and the bottom side of a write gap and a coil for generating a magnetic flux which is surrounded by an insulating layer and located between the top and bottom poles. The top and bottom poles respectively have areas with a uniform width near the region of the write gap close to a recording-medium opposite surface (air bearing surface) facing a magnetic recording medium (hereinafter referred to as a 'recording medium'), and these areas constitute a 'magnetic pole tip' which defines a record track width.

In order to improve a recording density among performances of the recording head, it is necessary to greatly reduce the width of the magnetic pole tip (magnetic pole width) to a submicron order and to increase a track density of a recording medium. In such a case, it is desirable that the magnetic pole width throughout the magnetic pole tip is constant with high accuracy. It is because a partially large magnetic pole width causes side erase phenomenon that writing is performed not only to a track area to be written but also to the adjacent track area, and the information already written in the adjoining track area will be overwritten and eliminated.

Thus, as the magnetic pole width decrease to a highly minute level, there is a more need for decreasing the thickness of the magnetic pole itself because of manufacturing requirements, and sizes of all the composition parts (for example, a coil) of the entire head tend to decrease to a highly minute level In order to maintain the excellent characteristic of overwriting information to the recording medium among the performances of the recording head, it is necessary to generate a sufficient quantity of magnetic flux by energizing the coil and to supply the generated magnetic flux to the magnetic pole portions. However, as a result of the trend of highly decreasing the size of the above-described composition parts, if the cross-section area of the coil is too small, the electric resistance value will become too large, amount of current flowing through the coil will decrease, and the amount of the generated magnetic flux will decrease remarkably, which is a problem. The reduction amount of the generated magnetic flux may cause a deficient magnetic flux for magnetizing the recording medium during recording information and a very poor overwriting characteristic.

SUMMARY OF THE INVENTION

The present invention has been achieved in view of the above problems. It is an object of the invention to provide a thin film magnetic head comprising a magnetic pole with a minute width and an excellent overwriting characteristic, and a method of manufacturing thereof.

A thin film magnetic head of the invention comprises a first magnetic layer and a second magnetic layer magnetically coupled to each other and having two magnetic poles facing each other with a gap layer in between near and in a recording-medium-facing surface to be faced with a recording medium; a thin film coil provided between the first and second magnetic layers; and an insulating layer for insulating the thin film coil from the first and the second magnetic layers, the first magnetic layer including a laminate of a first magnetic layer portion and a second magnetic layer portion, the first magnetic layer portion being located away from the gap layer and the second magnetic layer portion being located close to the gap layer, the second magnetic layer portion extending adjacent to the gap layer from the recording-medium-facing surface to a first position while maintaining a uniform width for defining a write track width on the recording medium, the first magnetic layer portion including a uniform width portion and a widened portion, the uniform width portion extending from the recording-medium-facing surface or its neighborhood to a second position located at or near the first position, while maintaining the same width as the uniform width of the second magnetic layer portion, the widened portion extending from the second position to a third position and having a width greater than that of the uniform width portion, wherein the thin film coil comprises a first thin film coil, most of the first thin film being included in a space defined by a thickness of the uniform width portion in the first magnetic layer portion, and the insulating layer comprises a first insulating layer portion located in a space defined by a thickness of the second magnetic layer portion and being in contact with the first thin film coil.

According to the thin film magnetic head of the invention, the thin film coil comprises the first thin film coil located so that most thereof may be included in the space defined by the thickness of the uniform width portion in the first magnetic layer portion, and the insulating layer comprises the first insulating layer portion located in a space defined by the thickness of the second magnetic layer portion and being in contact with the first thin film coil. Since the first thin film coil is located to be in contact with the first insulating layer portion, the thickness of the first thin film coil can be determined properly and independently from the thickness of the first insulating layer portion, compared to a head where a thin film coil is located in a space defined by the thickness of the second magnetic layer portion.

In the thin film magnetic head of the intention, a thickness of the first magnetic layer portion may be larger than the thickness of the first thin film coil.

In the thin film magnetic head of the invention, the thickness of the second magnetic layer portion may be 1.0 micron or less.

In the thin film magnetic head of the invention, an approximal surface of the first insulating layer portion in contact with the first thin film coil may be coplanar with a boundary surface between the first magnetic layer portion and the second magnetic layer portion.

In the thin film magnetic head of the invention, when the third position in the first magnetic layer portion is located between the recording-medium-facing surface and the thin film coil and the insulating layer further comprises a second insulating layer portion covering the first thin film coil, a first surface of the second insulating layer portion, the first surface being far from the first insulating layer portion may be coplanar with a second surface of the first magnetic layer portion, the second surface being far from the second magnetic layer portion.

In the thin film magnetic head of the invention, when the first magnetic layer further comprises a third magnetic layer portion partially overlapping and magnetically coupled to the first magnetic layer portion, a part of the first insulating layer portion may be located in an overlap area where the first magnetic layer portion and the third magnetic layer portion are overlapping each other.

In the thin film magnetic head of the invention, when the thin film coil further comprises a second thin film coil electrically connected with the first thin film coil and the first magnetic layer further comprises a fourth magnetic layer portion for connecting magnetically the first magnetic layer portion with the third magnetic layer portion, the second thin film coil may be located in a manner that most of the second thin film is included in a space defined by a thickness of the fourth magnetic layer portion.

In the thin film magnetic head of the invention, a recessed area is provided on an opposite side surface of the first insulating layer portion from the gap layer, and the first thin film coil may be located in the recessed area.

In the thin film magnetic head of the invention, the first insulating layer may be in contact with the second magnetic layer portion at the first position. In such a case, it is preferable that a boundary surface between the second magnetic layer portion and the first insulating layer portion is a plane and the boundary surface between the second magnetic layer portion and the first insulating layer portion is perpendicular to a direction in which the second magnetic layer portion extends.

In the thin film magnetic head of the invention, a magnetic material of the second magnetic layer portion may have a saturation magnetic flux density being equal to or higher than that of a magnetic material of the first magnetic layer portion. In such a case, it is preferred that the first magnetic layer portion is made of a magnetic material containing iron, nickel and cobalt, and the second magnetic layer portion is made of a magnetic material containing either a nickel-iron alloy or a cobalt-iron alloy.

In the thin film magnetic head of the invention, at least one of the first magnetic layer portion, the second magnetic layer portion, and the second magnetic layer may be made of a magnetic material containing iron nitride, a nickel-iron alloy or an amorphous alloy. It is preferred that the amorphous alloy is a cobalt-iron alloy, a zirconium-cobalt-iron alloy oxide, or a zirconium-iron alloy nitride.

In the thin film magnetic head of the invention, at least one of the first magnetic layer portion, the second magnetic layer portion, and the second magnetic layer may consist of a magnetic material containing iron, nickel, and cobalt.

A method of manufacturing a thin film magnetic head of the invention is applied to a thin film magnetic head including: a first magnetic layer and a second magnetic layer magnetically coupled to each other and having two magnetic poles facing each other with a gap layer in between near and in a recording-medium-facing surface to be faced with a recording medium; a thin film coil provided between the first and second magnetic layers; and an insulating layer for insulating the thin film coil from the first and the second magnetic layers, the first magnetic layer including a laminate of a first magnetic layer portion and a second magnetic layer portion, the first magnetic layer portion being located away from the gap layer and the second magnetic layer portion being located close to the gap layer, the second magnetic layer portion extending adjacent to the gap layer from the recording-medium-facing surface to a first position while maintaining a uniform width for defining a write track width on the recording medium, the first magnetic layer portion including a uniform width portion and a widened portion, the uniform width portion extending from the recording-medium-facing surface or its neighborhood to a second position located at or near the first position, while maintaining the same width as the uniform width of the second magnetic layer portion, the widened portion extending from the second position to a third position and having a width greater than that of the uniform width portion, the method comprises a first step of forming a first thin film coil as a part of the thin film coil in a manner that most of the first thin film coil is included in a space defined by a thickness of the uniform width portion in the first magnetic layer portion; and a second step of forming a first insulating layer portion as a part of the insulating layer, in a space defined by a thickness of the second magnetic layer portion so that the first insulating layer portion comes into contact with the first thin film coil.

In the method of manufacturing a thin film magnetic head of the invention, in a first step a first thin film coil as a part of the thin film coil is formed in a manner that most of the first thin film coil is included in a space defined by a thickness of the uniform width portion in the first magnetic layer portion and in a second step, a first insulating layer portion as a part of the insulating layer is formed in a space defined by a thickness of the second magnetic layer portion so that the first insulating layer portion comes into contact with the first thin film coil.

In the method of manufacturing the thin film magnetic head of the invention, the first magnetic layer portion may be formed so that a thickness thereof may become larger than a thickness of the first thin film coil.

In the method of manufacturing the thin film magnetic head of the invention, the second step may comprise the steps of forming a precursory-magnetic layer as a preparation layer of the second magnetic layer portion on the gap layer in an area from a position nearby which the recording-medium-facing surface is to be formed to the first position, forming a first precursory-insulating layer as a preparation layer of the first insulating layer portion to cover at least the precursory-magnetic layer and a circumference area thereof and polishing and flattening the first precursory-insulating layer until the precursory-magnetic layer is exposed, thereby forming the first insulating layer portion.

In the method of manufacturing the thin film magnetic head of the invention, when the third position in the first magnetic layer portion is located between the recording-medium-facing surface and the thin film coil and the insulating layer further comprises a second insulating layer portion covering the first thin film coil, the method further may comprise a third step of selectively forming the first magnetic layer portion at least on the precursory-magnetic layer; a fourth step of forming a second precursory-insulating layer portion as a preparation layer of the second insulating layer portion to cover at least the first magnetic layer portion and the first thin film coil; and a fifth step of polishing and flattening a surface of the second precursory-insulating layer until the first magnetic layer portion is exposed, thereby forming the second insulating layer portion.

In the method of manufacturing the thin film magnetic head of the invention, when the first magnetic layer further comprises a third magnetic layer portion partially overlapping and magnetically coupled to the first magnetic layer portion and a fourth magnetic layer portion for connecting magnetically the first magnetic layer portion with the third magnetic layer portion, the method further may comprise a sixth step of forming the second thin film coil which is electrically connected with the first thin film coil so that most of the second thin film is included in a space defined by the fourth magnetic layer portion.

In the method of manufacturing the thin film magnetic head of the invention, the method further may comprise a seventh step of forming a recessed area by selectively etching an opposite side surface of the first insulating layer portion from the gap layer to a predetermined depth after the second step, wherein the first thin film coil may be formed on the recessed area in the first step In the method of manufacturing the thin film magnetic head of the invention, the first magnetic layer portion may be formed by plating in the third step.

In the method of manufacturing the thin filth magnetic head of the invention, the third step may comprise the steps of forming a magnetic material layer at least on the precursory-magnetic layer and patterning by selectively etching the magnetic material layer so as to form the first magnetic layer portion. In such a case, it is preferable that the first magnetic layer portion is formed using a reactive ion etching in the patterning step. Moreover, it is preferable that the patterning step is performed in a gas atmosphere containing chlorine at a temperature within a range from 50° C. to 300° C.

Other and further objects, characteristics and advantages of the invention will appear more fully from the following description.

BRIEF DESCRIPTION OF THE DRAWINGS

FIGS. 2A and 2B are sectional views for explaining a process following the process shown in FIGS. 1A and 1B.

FIGS. 6A and 6B are sectional views for explaining a process following the process shown in FIGS. 5A and 5B.

FIGS. 8A and 8B are sectional views for explaining a process following the process shown in FIGS. 7A and 7B.

FIGS. 19A and 19B are sectional views for explaining a process following the process shown in FIGS. 18A and 18B.

FIGS. 21A and 21B are sectional views for explaining one process in a method of manufacturing a thin film magnetic head according to the second embodiment of the invention.

FIGS. 23A and 23B are sectional views for explaining a process following the process shown in FIGS. 22A and 22B.

FIGS. 25A and 2513 are sectional views for explaining a process following the process shown in FIGS. 24A and 24B.

FIGS. 29A and 2913 are sectional views showing another modification relating to the structure of the thin film magnetic head according to the first embodiment of the invention.

DETAILED DESCRIPTION OF THE PREFERRED EMBODIMENTS

An embodiment of the present invention will be described in detail below with reference to the accompanying drawings.

First Embodiment

First, with reference to FIGS. 1A–14A and FIGS. 1B–14B, a method of manufacturing a composite type magnetic head will be described as an example of a method of manufacturing a thin film magnetic head according to a first embodiment of the invention.

Figure 9:
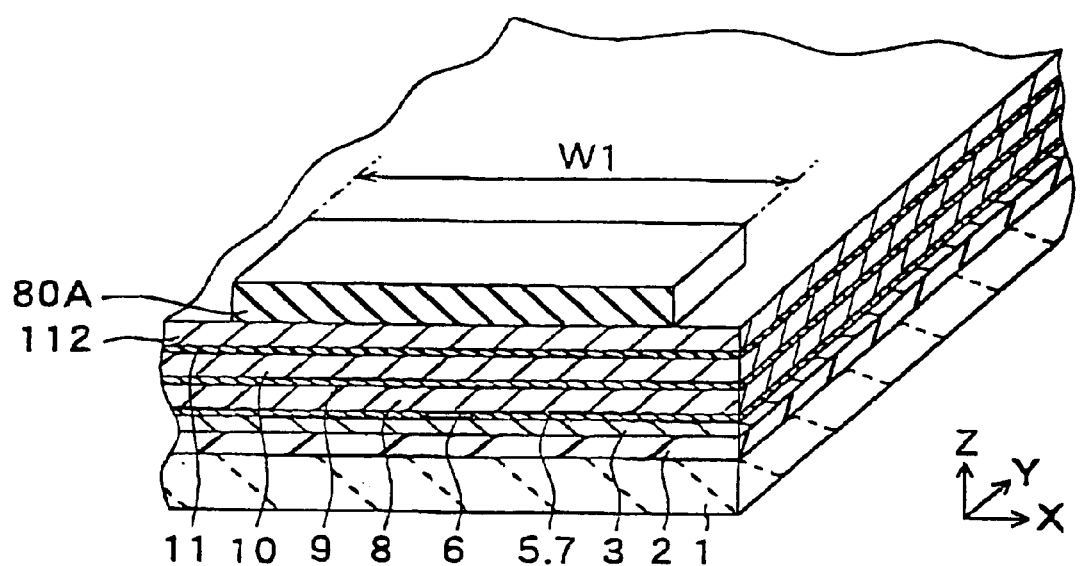
FIG. 9 is a perspective view corresponding to the sectional views shown in FIGS. 2A and 2B.
Figure 13:
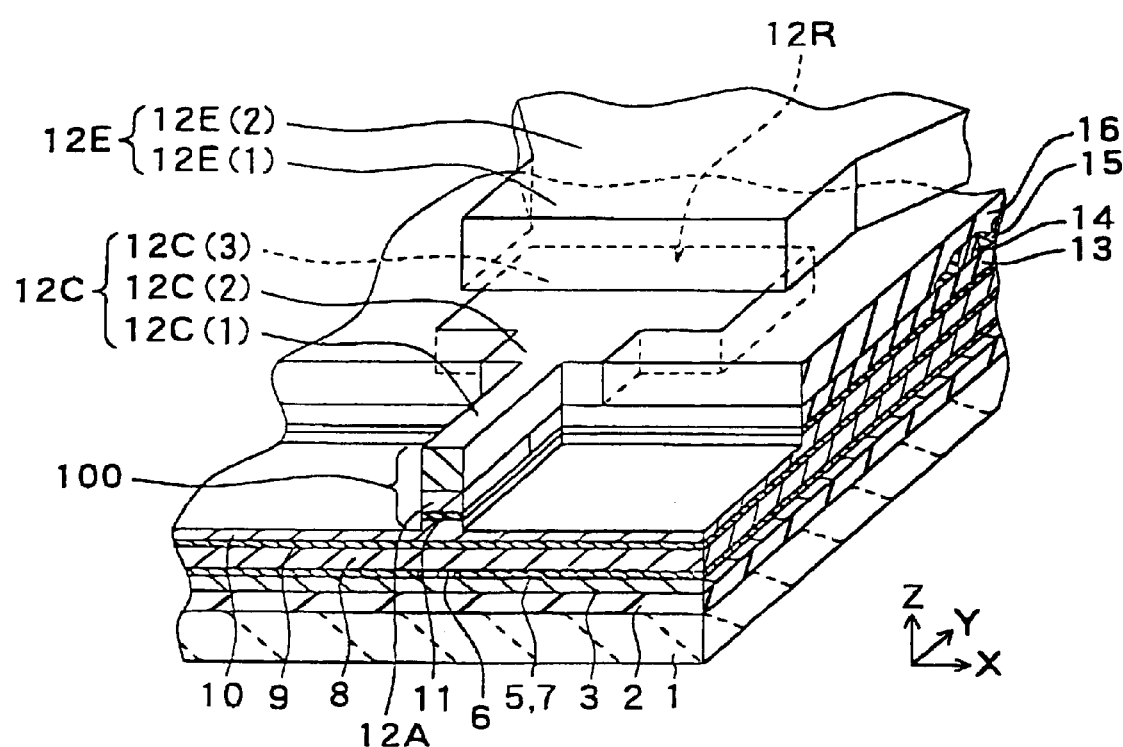
FIG. 13 is a perspective view corresponding to the sectional views shown in FIGS. 7A and 7B.
Figure 14:
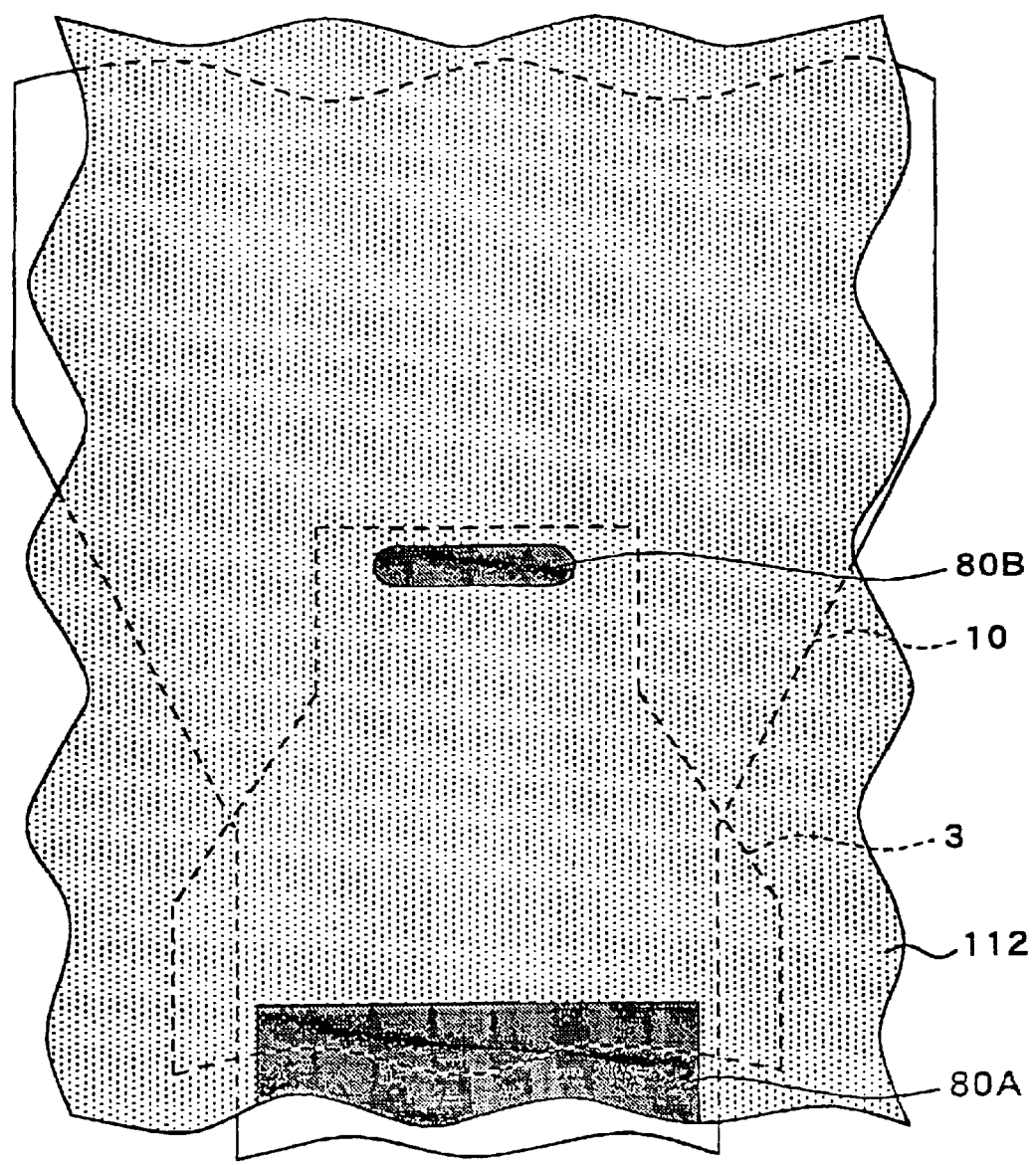
FIG. 14 is a plane view corresponding to the sectional views shown in FIGS. 2A and 2B.

Each of FIGS. 1A–8A shows a section perpendicular to an air bearing surface, and each of FIGS. 1B–8B shows a section of a magnetic pole portion parallel to the air bearing surface. FIGS. 9–13 are perspective views of structures corresponding to main manufacturing processes. FIG. 9 corresponds to the section shown in FIGS. 2A and 2B, FIG. 10 corresponds to the section shown in FIGS. 3A and 3B, FIG. 11 corresponds to the section shown in FIGS. 4A and 4B, FIG. 12 corresponds to the section shown in FIGS. 5A and 5B, and FIG. 13 corresponds to the section shown in FIGS. 7A and 7B. A precursory-insulating layer 13P in FIGS. 3A and 3B has been left out of FIG. 10, a photo resist film 90 in FIGS. 4A and 4B has been left out of FIG. 11, the photo resist film 90 in FIGS. 5A and 5B has been left out of FIG. 12, and an overcoat layer 17 and so on in FIGS. 7A and 7B have been left out of FIG. 13. FIG. 14 shows a plane structure corresponding to the structure shown in FIGS. 2A and 2B.

In the following description, the term 'width direction' means the direction of a X-axis in each of FIGS. 1A–14A and 1B–14B, the term 'length direction' means the direction of a Y-axis in each of FIGS. 1A–14A and FIGS. 1B–14B, and the term 'thickness (depth) direction or height direction' means the direction of a Z-axis in each of FIGS. 1A–14A and FIGS. 1B–14B. And, the term 'front (or forward)' means a side near an air bearing surface 70 of the direction of the Y-axis (or a side where the air bearing surface 70 is formed in the later process), and the term 'back (or rearward)' means the opposite side.

The Method of Manufacturing a Thin Film Magnetic Head

Figures 1A, 1B:
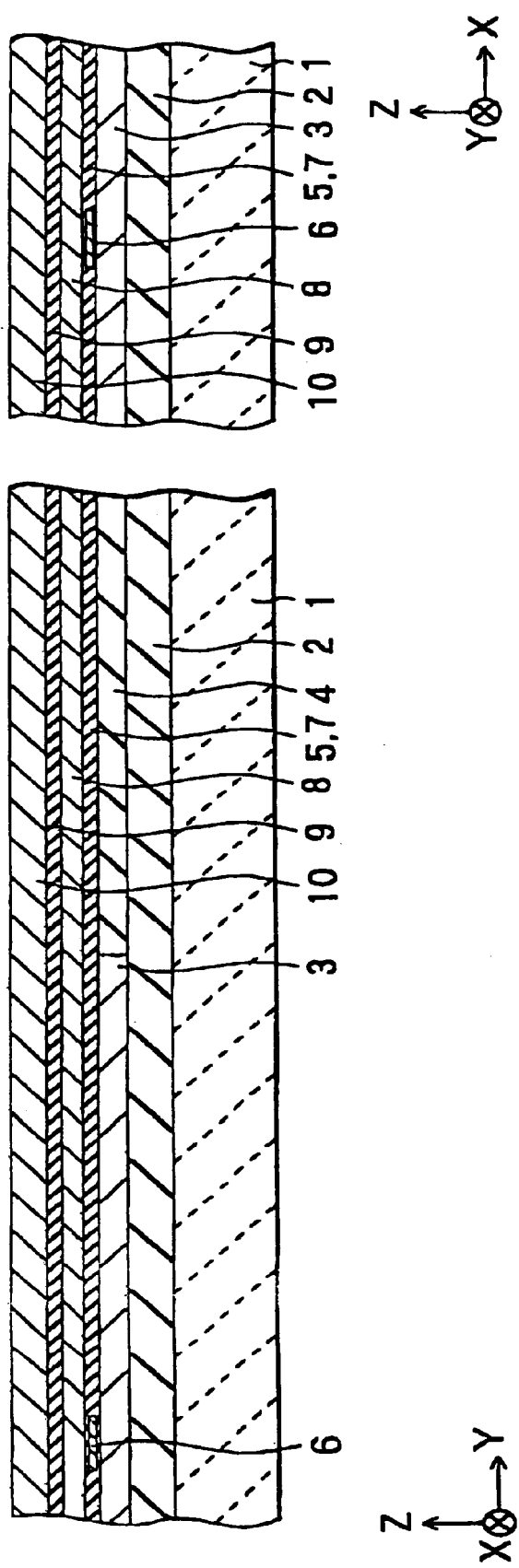
FIGS. 1A and 1B are sectional views for explaining one process in a method of manufacturing a thin film magnetic head according to a first embodiment of the invention.
Figure 15:
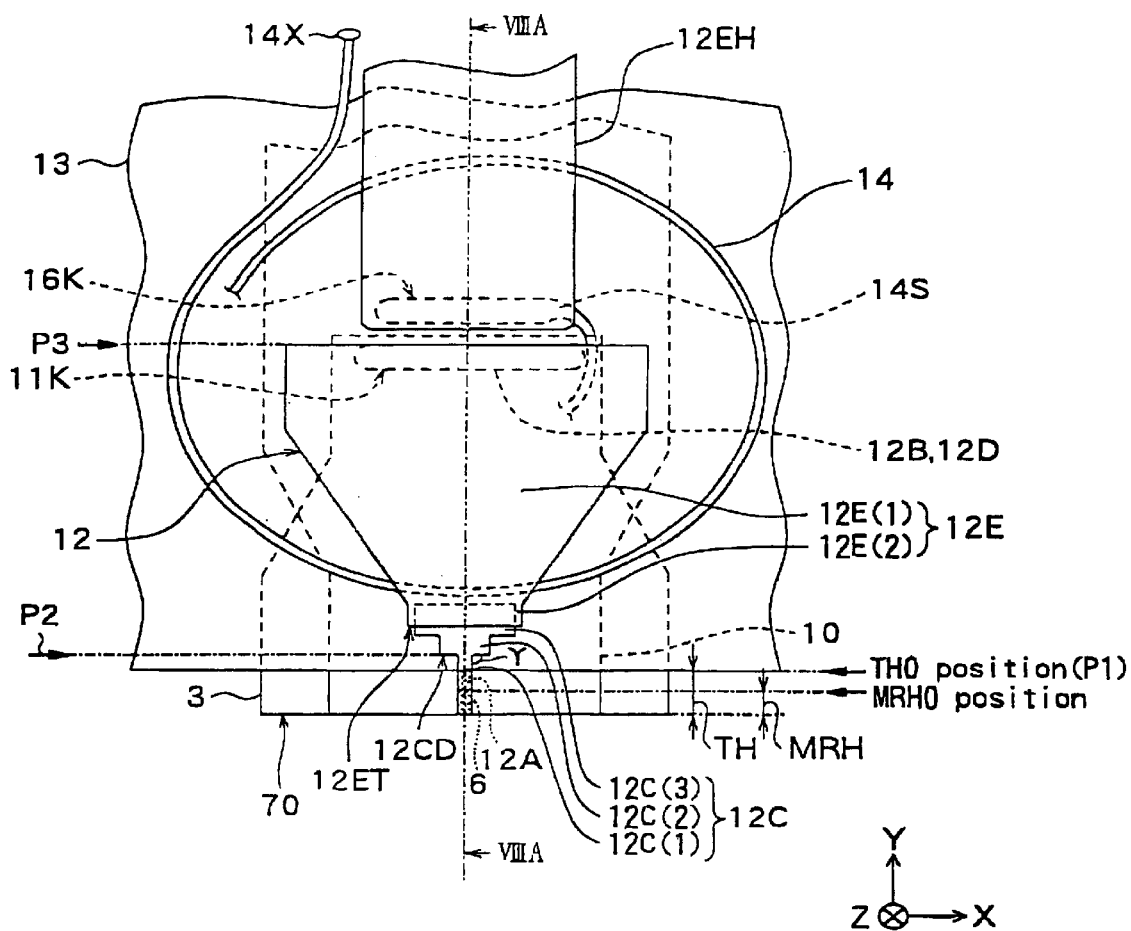
FIG. 15 is a plane view showing the plane structure of the thin film magnetic head according to the first embodiment of the invention.

According to the manufacturing method of the embodiment, first, as shown in FIGS. 1A and 1B, an insulating layer 2 consisted of an adequate material such as alumina is deposited at a thickness of about 3.0–5.0 $\mu$m on a substrate 1 consisted of an adequate material such as altic ($Al_2O_3$, TiC). Then, a lower shield layer 3 about 2.0–3.0 $\mu$m thick consisted of an adequate material such as a Permalloy (nickel:80 wt-%, Fe:20 wt-%) for a reproducing head is selectively formed on the insulating layer 2 using an adequate method such as a frame plating method. A more detailed description of the frame plating method will be given. The lower shield layer 3 is formed to have an adequate shape, for example, a plane shape as shown in FIG. 15 to be described later. In addition, as the Permalloy for forming the lower shield layer 3, other compositions than the above-described composition having 80 wt-% of Ni and 20 wt-% of Fe may be used. For example, a composition of 45 wt-% of Ni and 55 wt-% of Fe may be used. Then, an alumina layer about 4.0–5.0 $\mu$m thick is formed to cover the whole, and the surface of the alumina layer is polished to flatten the whole by a CMP (chemical machinery polish) method until the lower shield layer 3 is exposed, thus, an insulated film 4 is formed to fill a circumference area of the lower shield layer 3.

Then, as shown in FIGS. 1A and 1B, a shield gap film 5 about 100–200 nm thick consisted of an adequate material such as alumina is formed on the lower shield layer 3 by an adequate method such as sputtering. And, a MR film 6 of desired shape is formed on the lower shield layer 3 in order to constitute a MR element which is the principal part of the reproducing head using a highly precise photo lithography processing. And then, a lead layer (not shown) as a drawer electrode layer electrically connected with the MR film 6 is formed on the both sides of the MR film 6. And, a shield gap film 7 is formed on the lead layer, the shield gap film 5, and the MR film 6, to embed the MR film 6 in the shield gap films 5 and 7. Materials and methods of forming the shield gap film 7 are substantially identical to those of forming the shield gap film 5.

Then, as shown in FIGS. 1A and 1B, an upper shield layer 8 about 1.0–1.5 $\mu$m thick is selectively formed on the shield gap film 7. Materials, methods, and other requirements of forming the upper shield layer 8 are substantially identical to those of forming the lower shield layer 3. And, an insulated film 9 about 0.15–0.2 $\mu$m thick consisting of alumina is formed by sputtering on the upper shield layer 8.

Then, as shown in FIGS. 1A and 1B, a bottom magnetic pole 10 consisting of a magnetic material having a high saturation magnetic flux density such as iron nitride (FeN) is selectively formed on the insulated film 9. The bottom magnetic pole 10 is formed to have an adequate form, for example, a plane shape as shown in FIG. 15 to be described later.

For example, the bottom magnetic pole 10 is formed by the following procedures. That is, an iron nitride layer about 2.0–2.5 $\mu$m thick is first formed on the insulated film 9 by sputtering. Then, the bottom magnetic pole 10 is selectively formed by etching the iron nitride layer with a reactive ion etching (hereinafter referred to as 'RIE') to form a pattern using a mask having the predetermined form and material (for example, a metal material such as chromium). The surface of the bottom magnetic pole 10 becomes almost flat over the whole region Generally, the etching speed using the RIE as an etching method is quicker than that of an ion milling. Therefore, the RIE can be used to further shorten the time for forming the bottom magnetic pole 10 compared to the ion milling. Particularly, in forming the bottom magnetic pole 10 using the RIE etching process, an adequate etching condition such as a gas material and a processing temperature further enables the time required to form the bottom magnetic pole 10 to be shortened. A more detailed description of such adequate etching conditions will be given later. In addition, the material for forming the bottom magnetic pole 10 comprises amorphous alloys having a high saturation magnetic flux density like iron nitride such as a cobalt-iron alloy (FeCo), a zirconium-cobalt-iron-oxygen alloy (FeCoZrO), and an iron-zirconium-nitrogen alloy (FeZrN) as an alternative to iron nitride. The etching method for forming the pattern on the iron nitride layer is not limited to the RIE, and the ion milling may be used. The bottom magnetic pole 10 used herein corresponds to one example of a 'second magnetic layer' in the invention.

Then, as shown in FIGS. 2A and 2B, a write gap layer 11 about 0.1–0.15 $\mu$m thick consisting of a non-magnetic material such as alumina is evenly formed on the bottom magnetic pole 10 by an adequate method such as the sputtering The write gap layer 11 is formed not to cover an area in which a magnetic path connection part 12B will be formed in the later process. The area is an opening 11K for connecting the bottom magnetic pole 10 with a top magnetic pole 12 which will be formed in the later process. In addition to alumina described above, the material for forming the write gap layer 11 includes a non-magnetic metal material like alumina, for example, a nickel-copper (NiCu) alloy and the like. The write gap layer 11 used herein corresponds to one example of a gap layer in the invention.

Then, as shown in FIGS. 2A and 2B, a basic magnetic layer 112 about 0.5–1.5 $\mu$m thick consisting of a magnetic material with a high saturation magnetic flux density such as iron nitride is formed by sputtering to cover the whole. A preferred magnetic material used for constituting the basic magnetic layer 112 has a larger saturation magnetic flux density than that of a magnetic material (for example, iron-nickel-cobalt alloy) constituting a top magnetic layer 12C formed in the later process. As an alternative to iron nitride, the materials for forming the basic magnetic layer 112 may be amorphous alloys having a high saturation magnetic flux density same as iron nitride, such as a cobalt-iron-alloy (FeCo), a zirconium-cobalt-iron-oxygen alloy (FeCoZrO) and a zirconium-iron-nitrogen alloy (FeZrN).

Then, as shown in the FIGS. 2A, 2B, FIG. 9 and FIG. 14, masks 80A and 80B consisting of an inorganic material such as alumina are selectively formed in the required position of the basic magnetic layer 112. An area where the mask 80A is formed comprises an area where a second magnetic tip portion 12A will be formed in the later process. Specifically, the back end position of the mask 80A is less than about 0.5 $\mu$m back from the back end position of the MR film 6, and a width W1 of the mask 80A is larger enough than a width W2 (refer to FIGS. 5A and 5B and FIG. 12) of the second magnetic pole tip 12A described later. Moreover, an area where the mask 80B is formed corresponds to an area where the magnetic path connection part 12B will be formed in the later process. In addition, the back end position of the mask 80A is not limited to the above position behind the back end position of the MR film 6 and may be the same as the back end position of the MR film 6. Materials of the masks 80A and 80B comprise nitride aluminum in addition to alumina described above.

For example, the masks 80A and 80B are formed according to the following procedures. That is, first, an alumina layer is formed to cover the surface of the basic magnetic layer 112 by sputtering. Then, masks consisting of an adequate material such as a Permalloy (Ni: 80 wt-%, Fe: 20 wt-%) are formed on the alumina layer by the frame plating method. The masks are formed to have almost the same plane shape respectively as the final shapes of the masks 80A and 80B. Then, the alumina layer is etched by the RIE using the masks consisting of the Permalloy to form the masks 80A and 80B.

Then, using the masks 80A and 80B, the basic magnetic layer 112 is etched to form a pattern by an adequate method such as the RIE. An area of the basic magnetic layers 112 except the masks 80A and 80B formation is selectively removed by the etching process, a precursory-magnetic layer 112A is selectively formed in the front area on the write gap layer 11 as shown in the FIGS. 3A, 3B and FIG. 10, and the magnetic path connection part 12B constituting a part of the top magnetic pole 12 is selectively formed in the opening 11K. The precursory-magnetic layer 112A is formed so that an edge 112AT in the width direction of the back end part of the precursory-magnetic layer 112A will have a linear shape. Specifically, the basic magnetic layer 112 is etched by the RIE so that a back end side 112AM of the precursory-magnetic layer 112A will have a plane and become perpendicular to a flat surface 11H of the write gap layer 11. The precursory-magnetic layer 112A is a preparation layer for forming the second magnetic pole tip 12A by etching and forming a pattern in the later process. The above-described preparation layer on which a required pattern will be formed in the later process will be termed the 'precursory-layer' and referred to the term 'precursory-layer' in the following description. By using the RIE as the etching method for forming the pattern of the basic magnetic layer 112, the precursory-magnetic layer 112A and the magnetic path connection part 12B can be formed accurately within a very short time It is understood that each of the masks 80A and 80B will also be etched by the etching process for forming the precursory-magnetic layer 112A and those thickness will decrease. When the etching process is completed, the masks 80A and 80B may remain (refer to FIGS. 3A, 3B and FIG. 10) or not.

Figure 3B:
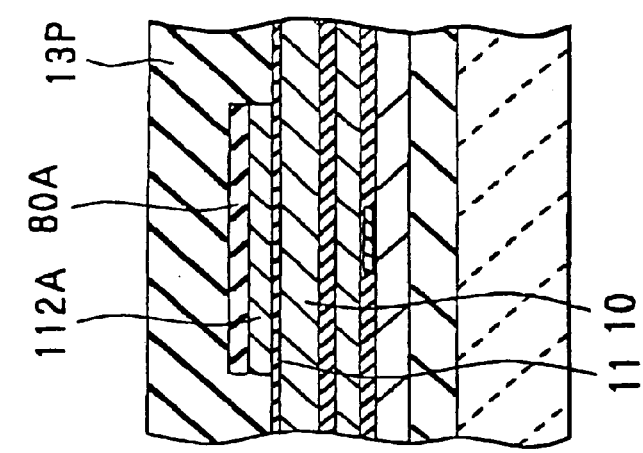
FIGS. 3A and 3B are sectional views for explaining a process following the process shown in FIGS. 2A and 2B.
Figure 3A:
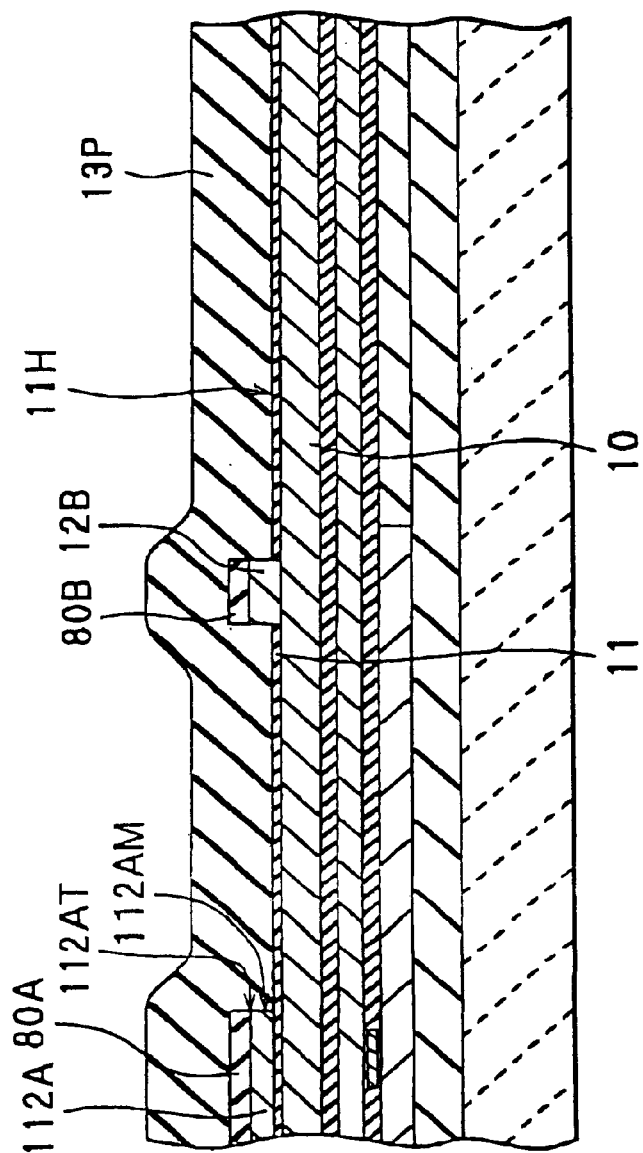

Then, as shown in FIGS. 3A and 3B, the precursory-insulating layer 13P about 0.8–2.0 $\mu$m thick is formed to cover the whole. The precursory-insulating layer 13P used herein corresponds to one example of a 'first precursory-insulating layer' in the invention.

Figures 4A, 4B:
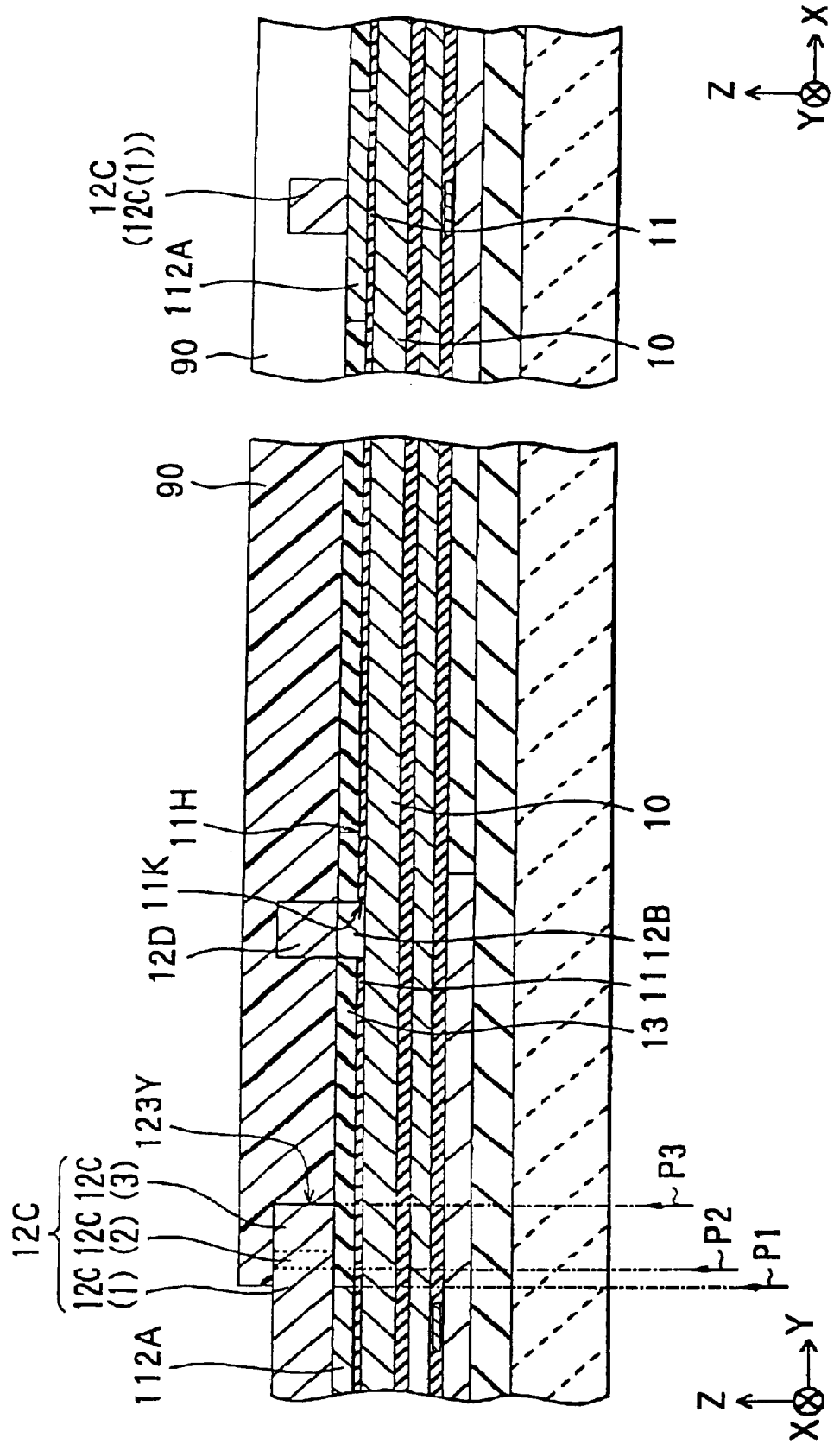
FIGS. 4A and 4B are sectional views for explaining a process following the process shown in FIGS. 3A and 3B.
Figures 5A, 5B:
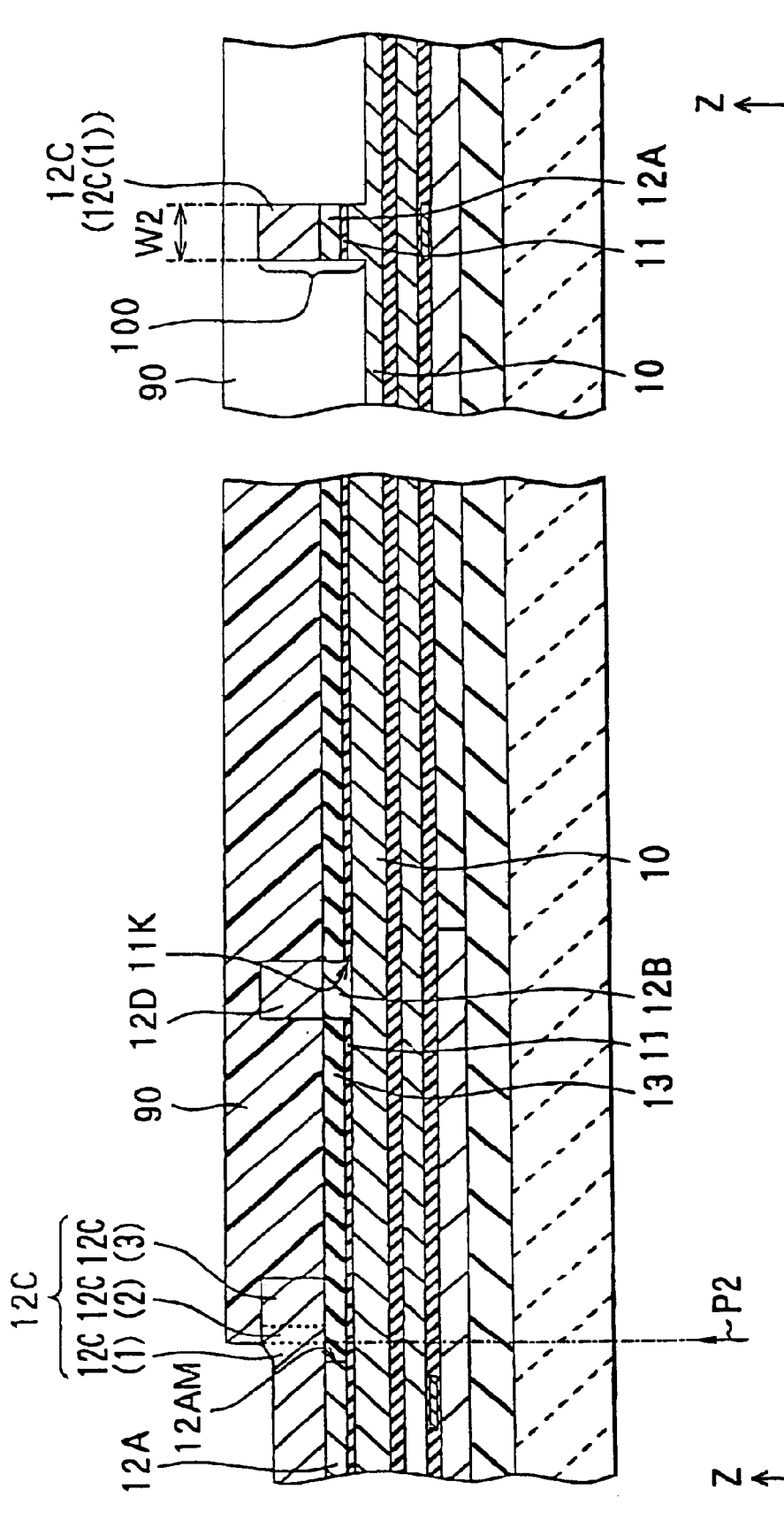
FIGS. 5A and 5B are sectional views for explaining a process following the process shown in FIGS. 4A and 4B.

Then, the whole surface of the precursory-insulating layer 13P is polished and flattened by an adequate method such as the CMP method. By the polish processing, as shown in FIGS. 4A and 4B, an insulated film 13 is formed to fill the circumference area of the precursory-magnetic layer 112A and the magnetic path connection part 12B. The preferred thickness of the insulated film 13 formed by the above-described polish processing is, for example, about 1.0 $\mu$m or less (for example, 0.5–1.3 $\mu$m, more preferably 0.5–1.0 $\mu$m). A boundary surface 123Y between the precursory-magnetic layer 112A and the insulated film 13 becomes plane and perpendicular to the flat surface 11H of the write gap layer 11. The position of the front end of the insulated film 13 is a reference position for determining a throat height (TH) which is one of the factors which determine the performance of a recording head, i.e. zero throat height position (TH0 position). The insulated film 13 used herein corresponds to one example of a 'first insulating layer portion' in the invention.

Figure 11:
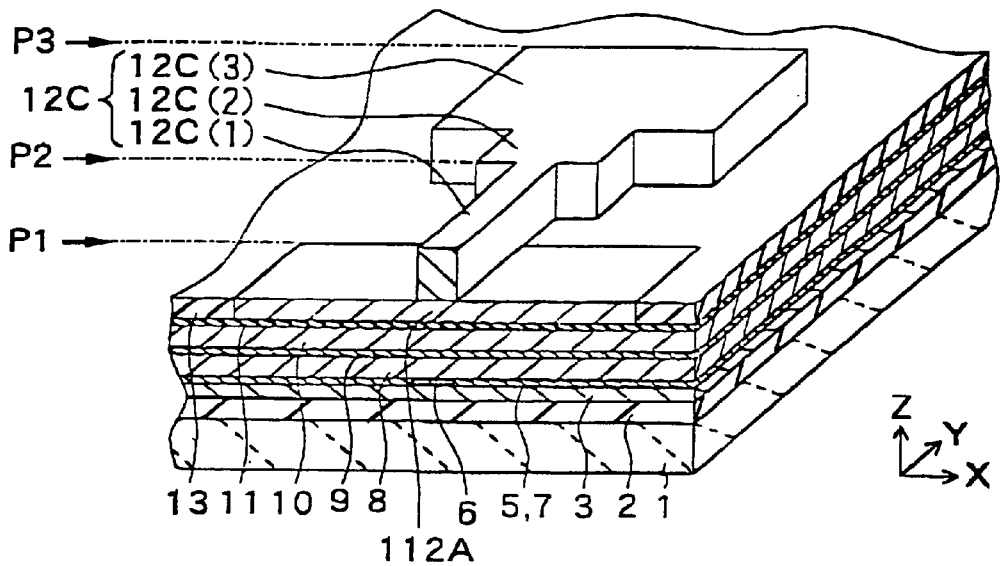
FIG. 11 is a perspective view corresponding to the sectional views shown in FIGS. 4A and 4B.
Figure 12:
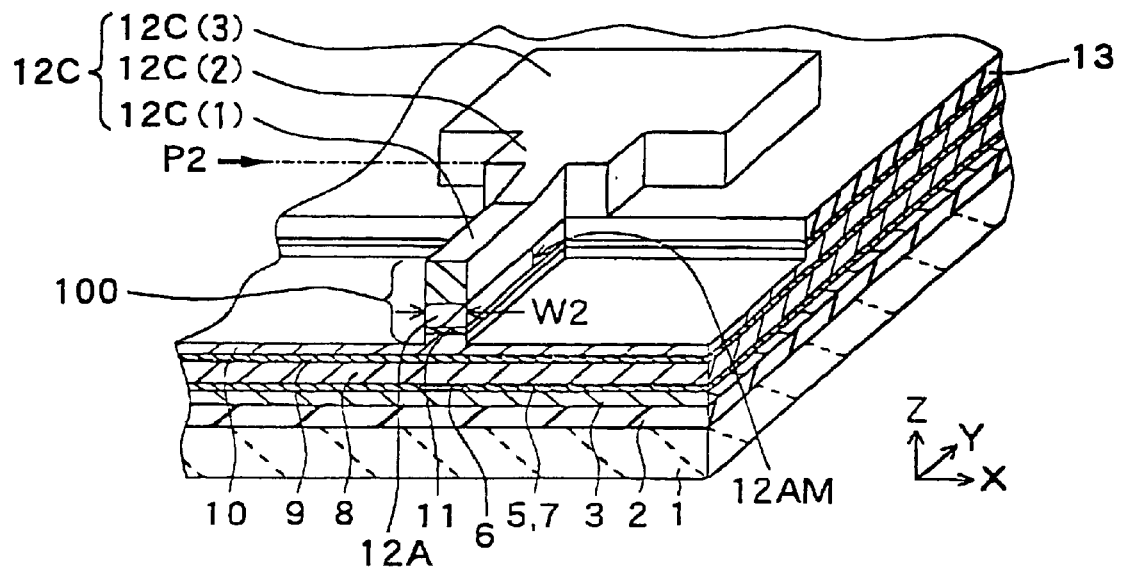
FIG. 12 is a perspective view corresponding to the sectional views shown in FIGS. 5A and 5B.

As shown in FIGS. 4A, 4D and FIG. 11, the top magnetic layer 12C about 1.5–2.5 $\mu$m thick consisting of a magnetic material which has a high saturation magnetic flux density including iron (Fe), nickel (Ni), and cobalt (Co) such as an iron-nickel-cobalt alloy (CoNiFe: Co; 45 wt-%, nickel: 30 wt-%, Fe: 25 wt-%) is selectively formed on a flat area of the insulated film 13 and the precursory-magnetic layer 112A by an adequate method such as the frame plating method, and a magnetic path connection part 12D is simultaneously formed selectively on the magnetic path connection part 12B. Both the top magnetic layer 12C and the magnetic path connection part 12D constitute a part of the top magnetic pole 12. Specifically, the top magnetic layer 12C is formed to have a larger thickness than that of a thin film coil 14 formed in the later process. In addition, materials for forming the top magnetic layer 12C and the magnetic path connection part 12D include at least one of chromium (Cr), boron (B), gold (Au), and copper with the three above-described metallic elements.

The top magnetic layer 12C is formed to comprise a first magnetic pole tip 12C(1), a intermediate part 12C(2), and a back end part 12C(3) in the order from the side (left-hand side in FIG. 4A) on which the air bearing surface 70 will be formed in the later process as shown in FIG. 15 described later. And, the first magnetic pole tip 12C(1) is formed to have a uniform width (about 0.1–0.2 $\mu$m) which specifies the record track width of a recording medium. Moreover, a connection position P2 (a second position) between the first magnetic pole tip 12C(1) and the intermediate part 12C(2) is behind a back end position P1 (a first position) of the precursory-magnetic layer 112A, and for example, a back end position P3 (a third position) of the back end part 12C(3) may be located in front of the thin film coil 14 (See FIG. 6A) formed in the later process The structural characteristic of the top magnetic layer 12C will be described later.

The first magnetic pole tip 12C(1) used herein corresponds to one example of a 'uniform width portion' in the invention, and the intermediate part 12C(2) and the back end part 12C(3) used herein correspond to one example of an 'widend portion' in the invention. Moreover, the top magnetic layer 12C used herein corresponds to one example of a 'first magnetic layer portion' in the invention.

In the process of forming the magnetic layer 12C by the frame plating method, an electrode film (not shown) about 70 μm thick used as a seed layer in an electrolysis plating method is first formed by an adequate method such as the sputtering. Materials used for forming the electrode film include an iron-nickel-cobalt alloy (Co: 45 wt-%, nickel: 30 wt-%, Fe: 25 wt-%) having a high saturation magnetic flux density and the like. Then, a photo resist film (not shown) is formed on the electrode film by an adequate method such as applying a positive photo resist (hereinafter referred to as a 'photo resist'). And then, the required area of the photo resist film is selectively exposed using a mask (not shown) with a required shape pattern Then, the exposure area of the photo resist film is developed to form a frame pattern, i.e. an outer frame (not shown), used in a plating processing of the frame plating method. The frame pattern comprises an opening corresponding to the above-described exposure area. Then, the top magnetic layer 12C consisting of the iron-nickel-cobalt alloy (Co: 45 wt-%, nickel: 30 wt-%, Fe: 25 wt-%) is formed by the electrolysis plating method using the frame pattern as a mask and using the electrode film formed in the above-described process as the seed layer. Finally, the frame pattern is removed. In addition, the magnetic path connection part 12D is also formed using the same material or the like and the same method or the like as the above-described top magnetic layer 12C.

Then, as shown in FIGS. 4A and 4B, the photo resist film 90 is selectively formed to cover the front end position (TH0 position) of the insulated film 13 or a rearward area behind the TH0 position. The photo resist film 90 can prevent the insulated film 13 etched during the etching process for forming the second magnetic pole tip 12A, a magnetic pole part 100, and so on in the later process.

Then, the precursory-magnetic layer 112A and the circumference area thereof are selectively etched by an adequate method such as the RIE using both the top magnetic layer 12C and the photo resist film 90 as a mask. An area of the precursory-magnetic layer 112A except the area corresponding to the first magnetic pole tip 12C(1) of the top magnetic layer 12C is selectively removed by an etching process to form the second magnetic pole tip 12A constituting a part of the top magnetic pole 12 as shown in the FIGS. 5A, 5B and FIG. 12. By using the RIE as the etching method for forming the pattern on the basic magnetic layer 112, the second magnetic pole tip 12A can be formed accurately within a very short time. Like the first magnetic pole tip 12C(1) of the top magnetic layer 12C, the second magnetic pole tip 12A has a uniform width, which specifies the record track width on the recording medium. During the etching process for forming the second magnetic pole tip 12A, the masks, i.e. the top magnetic layer 12C and the photo resist film 90, will respectively also etched and the thicknesses thereof will decrease. Moreover, the photo resist film 90 will be also etched from the front side thereof by the etching process, so that the position of the front end moves rearward gradually. The second magnetic pole tip 12A used herein corresponds to one example of a 'second magnetic layer portion' in the invention.

Specifically, it is preferred that an etching gas such as a mixture containing at least one of chlorine ($Cl_2$), boron trichloride ($BCl_3$), hydrogen chloride (HCl), carbon tetrafluoride ($CF_4$), sulfur hexafluoride ($SF_6$), and boron tribromide ($BBr_3$) and at least one of hydrogen ($H_2$), oxygen ($O_2$), nitrogen ($N_2$), argon (Ar), and the like is used and the processing temperature is within a range of 50–300° C. for forming the second magnetic pole tip 12A by the RIE etching process. The RIE etching process under the above-described temperature in such a gas atmosphere promotes particularly the chemical reaction in the etching process of the precursory-magnetic layer 112A consisting of iron nitride and further shorten the time of forming the second magnetic pole tip 12A.

Furthermore, the write gap layer 11 and the bottom magnetic poles 10 are respectively and partially etched to remove about 0.3–0.4 μm using the top magnetic layer 12C and the photo resist film 90 as the mask by an adequate method such as the RIE. As a result, some of the write gap layers 11 in the circumference of the second magnetic pole tip 12A, the bottom magnetic poles 10, and the insulated films 13 are respectively and selectively removed by the etching process, so that the magnetic pole portion 100 having a trim structure is formed as shown in the FIGS. 5A, 5B and FIG. 12. For example, the magnetic pole portion 100 could be formed so that the front end position of the photo resist film 90 reaches the connection position P2 between the top magnetic layer 12C(1) and the intermediate part 12C(2) in the first magnetic pole tip 12C. The magnetic pole portion 100 comprises the first magnetic pole tip 12C(1) of the top magnetic layer 12C, the second magnetic pole tip 12A, a part of the write gap layer 11, and the portion of the bottom magnetic poles 10 corresponding to the tip 12A and the like. Each of the above-described parts constituting the magnetic pole portion 100 has substantially the same width. The RIE used as the etching method permits the magnetic pole portion 100 to be formed accurately within a very short time.

Specifically, it is preferred that an etching gas such as a mixture gas containing chlorine and boron trichloride is used and the processing temperature is within a range of 100–200° C. for forming the magnetic pole portion 100 by the RIE etching process. The RIE etching process under the above-described temperature in such a gas atmosphere may further shorten the time of forming the magnetic pole portion 100.

Then, after removing the photo resist film 90, as shown in FIG. 6A, the thin film coil 14 about 0.8–1.5 μm thick for an inductive recording head consisting of an adequate material such as copper is selectively formed on the flat insulated film 13 and in a rearward area behind the formation area of the top magnetic layer 12C (except for the locating area of the magnetic path connection part 12D) by an adequate method such as the electrolysis plating. It is preferred that the thin film coil 14 has a winding structure as shown in FIG. 15 described later. Moreover, the preferred width of each turn of the winding is, for example, about 0.5 μm, each spacing between the turns is, for example, about 0.3 μm. Only some essential parts of the thin film coils 14 are illustrated in FIGS. 6A and 6B. For example, a coil connection part 14S which is the end part on the core side of the coil 14 and the thin film coil 14 could be integrally formed on the insulated film 13 during forming the thin film coil 14. The coil connection part 14S will be connected electrically with the thin film coil 14 and a coil connection wiring 12EH (refer to FIG. 7A) formed in the later process. The thin film coil 14 used herein corresponds to one example of a 'thin film coil', or a 'first thin film coil' in the invention.

Then, a required pattern of a material capable of flowing under heat, for example, an organic insulation material such as a photo resist, is formed between turns of the winding of the thin film coil 14 (including the coil connection part 14S) and on the periphery of the coil 14 by a high accuracy photo lithography processing. And, the photo resist film is heated to a temperature within 200–250° C. by an adequate heating process, so that the photo resist flows and fills completely between the turns of the winding of the thin film coil 14 and the peripheral area of the coil 14 to form an insulated film 15 as shown in FIG. 6A. The insulated film 15 may be formed to cover the upper surfaces of the thin film coil 14 and the coil connection part 14S or not to (refer to FIG. 6A).

Then, a precursory-insulating layer 16P about 2.0–3.0 μm thick is formed to cover the whole by an adequate method such as the sputtering to embed an uneven structure area including the top magnetic layer 12C, the magnetic path connection part 12D, and the thin film coil 14 as shown in FIG. 6A. The precursory-insulating layer 16P used herein corresponds to one example of a 'second precursory-insulating layer' in the invention.

Figures 7A, 7B:
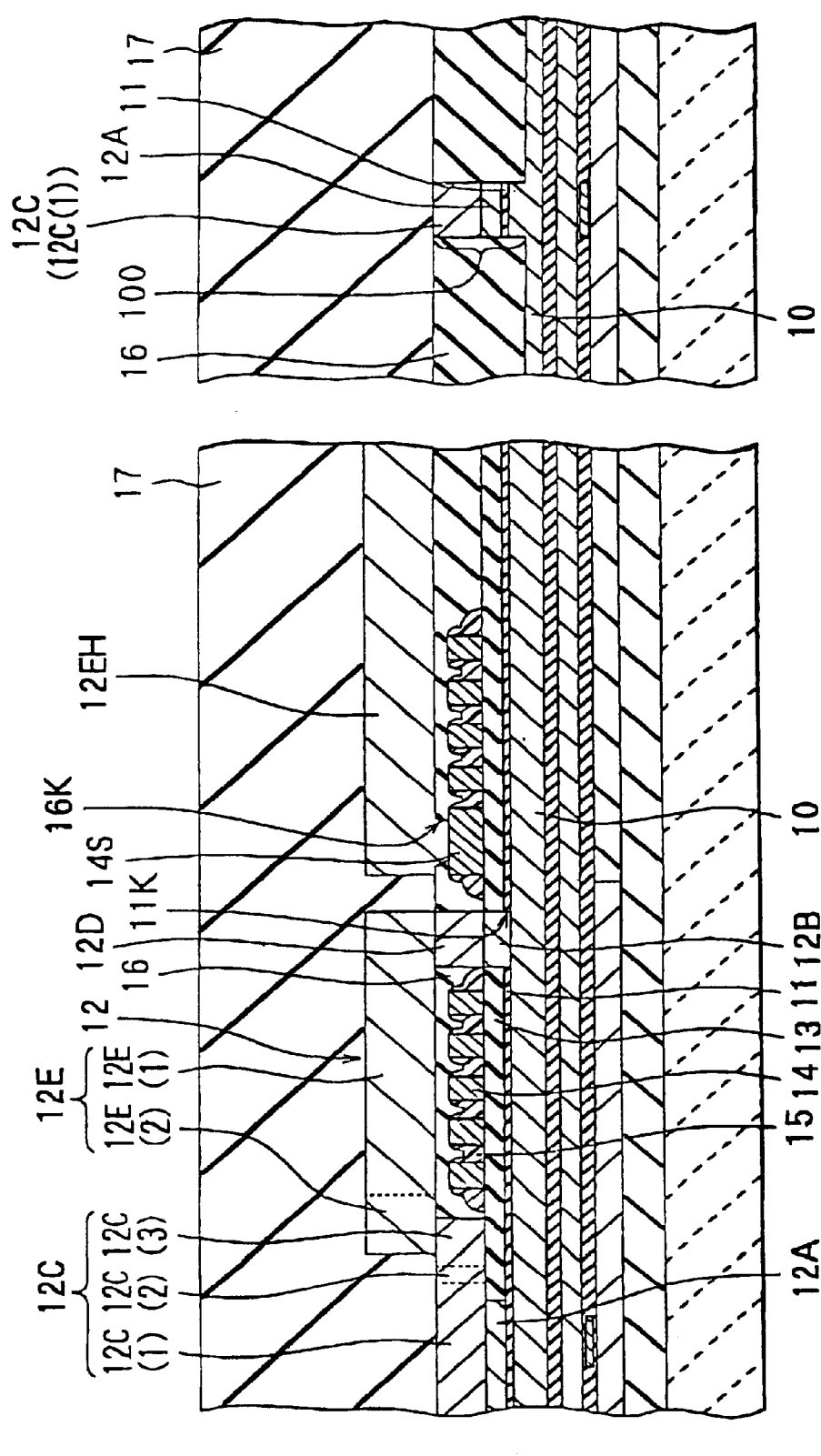
FIGS. 7A and 7B are sectional views for explaining a process following the process shown in FIGS. 6A and 6B.

Then, the whole surface of the precursory-insulating layer 16P is polished and flattened by an adequate method such as the CMP method. An insulated film 16 is formed by the polish processing to bury the thin film coil 14 and the above-mentioned parts as shown in FIGS. 7A and 7B. It is preferred that the polish processing is performed until the surface of the top magnetic layer 12C becomes flat over the whole The insulated films 15 and 16 used herein correspond to one example of a 'second insulating layer portion' in the invention, and the insulated films 13, 15, and 16 herein used correspond to one example of an 'insulating layer' in the invention.

Then, as shown in FIG. 7A, the insulated film 16 covering the upper part of the coil connection part 14S is partially etched with an adequate method such as the RIE or the ion milling to form an opening 16K for connecting the coil connection part 14S with the coil connection wiring 12EH formed in the later process.

Then, an upper yoke 12E about 2.0–3.0 μm thick constituting a part of the top magnetic pole 12 is formed in a required part such as a flat part from the upper part of the back end part 12C(3) of the top magnetic layer 12C to the magnetic path connection part 12D among the flattened area as shown in FIG. 7A. At the same time, the coil connection wiring 12EH is selectively formed on the area from the exposed surface of the coil connection part 14S in the opening 16K to an external circuit (not shown). The upper yoke 12E may be formed to have a desired shape such as a plane shape as shown in FIG. 15 described later. The structural characteristic of the upper yoke 12E will be described later. For example, the upper yoke 12E can be formed so that the position of the front end thereof will be behind the connection position between the intermediate part 12C(2) and the back end part 12C(3) of the top magnetic layer 12C and the position of the back end thereof will reaches the back end position of the magnetic path connection parts 12B and 12D. The back portion of the upper yoke 12E is magnetically connected with the bottom magnetic pole 10 through the magnetic path connection parts 12D and 12B and the opening 11K, and the forward portion thereof is magnetically connected with the second magnetic pole tip 12A through the top magnetic layer 12C. That is, the connection between the top magnetic pole 12 (the second magnetic pole tip 12A, the top magnetic layer 12C, the magnetic path connection parts 12B and 12D, and the upper yoke 12E) and the bottom magnetic pole 10 will form a propagation route of a magnetic flux, i.e. a magnetic path. The upper yoke 12E used herein corresponds to one example of a 'third magnetic layer portion' in the invention here, and the top magnetic pole 12 including the second magnetic pole tip 12A, the top magnetic layer 12C, the magnetic path connection parts 12B and 12D, and the upper yoke 12E used herein corresponds to one example of a 'first magnetic layer' in the invention.

Materials and methods of forming the upper yoke 12E and the coil connection wiring 12EH are, for example, the same as those of the bottom magnetic pole 10 or the like. For example, after forming an iron nitride layer by sputtering, the upper yoke 12E and the coil connection wiring 12EH are formed by etching the iron nitride layer to form a pattern using the RIE. Adequate RIE etching process conditions such as an etching gas material and a processing temperature are able to further shorten the required time and to accurately form the upper yoke 12E and the coil connection wiring 12EH as in the formation of the bottom magnetic pole 10.

Then, as shown in FIGS. 7A and 7B, the overcoat layer 17 about 20–40 μm thick consisting of an insulated material, for example, an inorganic insulation material such as alumina is formed to cover the whole. The structure of the circumference of the top magnetic layer 12C when the overcoat layer 17 is formed is shown in FIG. 13.

Finally, as shown in FIGS. 8A and 8B, the air bearing surface 70 of the recording head and the reproducing head is formed by means of a machining and a polishing process to complete the thin film magnetic head.

Structure of a Thin Film Magnetic Head

With reference to FIG. 15, a plane structure of a thin film magnetic head according to the embodiment is described below.

FIG. 15 shows a schematic view of the plane structure of the thin film magnetic head manufactured by the method of manufacturing of the thin film magnetic head according to the embodiment. The insulated films 15 and 16 and the overcoat layer 17 have been left out of FIG. 15. Moreover, only a part of the outermost turn of the thin film coil 14 is illustrated. FIG. 8A shows a cross section taken along the line VIIIA—VIIIA in FIG. 15. In addition, representations of the directions of X-, Y-, and Z-axis in FIG. 15 are the same as those of FIGS. 1A and 1B to FIGS. 8A to 8B and FIGS. 9–14.

The front end position of the insulated film 13 (the back end position P1 of the second magnetic pole tip 12A) is the reference position, i.e. a zero throat height position (TH0 position), for determining a throat height (TH). The throat height (TH) is specified as length from the front end position (TH0 position) of the insulated film 13 to the air bearing surface 70. A 'MRH0 position' in FIG. 15 represents the back end position of the MR film 6, i.e. a zero MR height position. A MR height (MRH) is the length from the zero MR height position to the air bearing surface 70. The zero throat height position (TH0 position) and the zero MR height position (MRHO position) are, for example, nearly the same.

The top magnetic pole 12 comprises the second magnetic pole tip 12A, the top magnetic layer 12C, the magnetic path connection parts 12B and 12D, and the upper yoke 12E which are respectively and separately formed as described above. That is, the top magnetic pole 12 is an assembly including these parts.

The second magnetic pole tip 12A has a desired shape such as a plane rectangle shape, and has a uniform width over the whole region. The top magnetic layer 12C contains the first magnetic pole tip 12C(1), the intermediate part 12C(2), and the back end part 12C(3) in the order from the air bearing surface 70 as described above. Each of these parts has a desired shape such as a plane rectangle shape. The first magnetic pole tip 12C(1) has the same uniform width as that of the second magnetic pole tip 12A and is longer than the second magnetic pole tip 12A. The intermediate part 12C(2) is wider than the first magnetic pole tip 12C(1), and the back end part 12C(3) is wider than the intermediate part 12C(2), for example. That is, a stepped shape in the width direction will be formed in the connection portion between the first magnetic pole tip 12C(1) and the intermediate part 12C(2). The parts constituting the top magnetic layer 12C are coaxial in the width direction.

The upper yoke 12E comprises the yoke part 12E(1) having a large area for holding the magnetic flux generated by the thin film coil 14 and the connection part 12E(2) having a uniform width smaller than that of the yoke part 12E(1) The yoke part 12E(1) has a rearward portion with an almost uniform width and a forward portion, which narrows gradually toward the air bearing surface 70. For example, the width of the connection part 12E(2) is larger than the back end part 12C(3) of the top magnetic layer 12C. It should be noted that the width is not necessarily as the above description and the width of the connection part 12E(2) may be narrower than that of the back end part 12C(3). For example, the position of a front edge side 12ET of the upper yoke 12E may be behind the connection position between the intermediate part 12C(2) and the back end part 12C(3) of the top magnetic layer 12C. That is, the upper yoke 12E could be located away from the air bearing surface 70. In addition, the location of the upper yoke 12E is not necessarily limited to the above description, for example, the position of the front edge side 12ET could be substantially the same as the connection position between the intermediate part 12C(2) and the back end part 12C(3). The upper yoke 12E and the top magnetic layer 12C are coaxial in the width direction.

For example, the position of a front face 12CD of the intermediate part 12C(2) constituting a part of the stepped shape and adjoining to the first magnetic pole tip 12C(1) may be behind the position of the TH0 position. In the above-described connection portion, the angle γ of the corner part between an edge side of the first magnetic pole tip 12C(1) and the side 12CD could be 90 degrees, for example. In addition, the angle γ of the corner part is not necessarily limited to 90 degrees, and it is preferred that the angle γ is within a range from 90 degrees to 120 degrees. The angle γ within the above range can provide a smooth flow of the magnetic flux which flows from the intermediate part 12G(2) into the first magnetic pole tip 12C(1).

The thin film coil 14 is a winding object that has the highly minute spiral shape as described above. A terminal 14X constituting the outside end part of the thin film coil 14 and the coil connection wiring 12EH connect respectively with the external circuit (not shown) which provides a current to the thin film coil 14.

Operation of Thin Film Magnetic Head

In the thin film magnetic head, when an electric current flows through the thin film coil 14 by the external circuit (not shown) during recording information, a magnetic flux will correspondingly generate. The generated magnetic flux propagates from the yoke part 12E(1) to the connection part 12E(2) inside the upper yoke 12E and then flows into the back end part 12C(3) of the top magnetic layer 12C. The magnetic flux flowing into the back end part 12C(3) passes through the intermediate part 12C(2), propagates to the first magnetic pole tip 12C(1), and reaches the tip portion of the first magnetic pole tip 12C(1) facing the air bearing surface 70, and a part of magnetic flux propagated to the first magnetic pole tip 12C(1) also propagates to the second magnetic pole tip 12A magnetically connected with the first magnetic pole tip 12C(1) and reaches to the tip portion thereof. The magnetic flux which reaches both tip portions of the first magnetic pole tip 12C(1) and the second magnetic pole tip 12A will generate a signal magnetic field for recording in the nearby exterior of the write gap layer 11. The signal magnetic field allows the magnetic recording medium to be magnetized partially for recording information thereon. In order to secure the excellent overwriting characteristic, it is necessary to generate a required sufficient quantity of the magnetic flux by energizing the thin film coil 14.

On the other hand, a sense current is conducted through the MR film 6 of the reproducing head part for the reproduction. Since the resistance of the MR film 6 changes according to the reproduction signal magnetic field from the magnetic recording medium, the information recorded on the magnetic recording medium can be read by detecting resistance changes, i.e. changes of the sense current.

Effects of First Embodiment

The thin film magnetic head according to the embodiment comprises the thin film coil 14 located in the rearward area defined by the thickness of the first magnetic pole tip 12C(1) of the top magnetic layer 12C, which can provide the uniform width of the second magnetic pole tip 12A with high accuracy, secure an excellent overwriting characteristic, and contribute to further decreasing the fine width of the winding of the thin film coil 14, on the basis of the following reasons. That is, as described above, the winding of the thin film coil 14 have a very fine width for purposes such as compactness of the thin film magnetic head (for example, the winding width is about 0.5 μm). In such a case, in order to obtain the excellent overwriting characteristic, the thin film coil 14 should have a proper cross-section area (for example, 0.8 μm or more of the thickness)

Figures 16A, 16B:
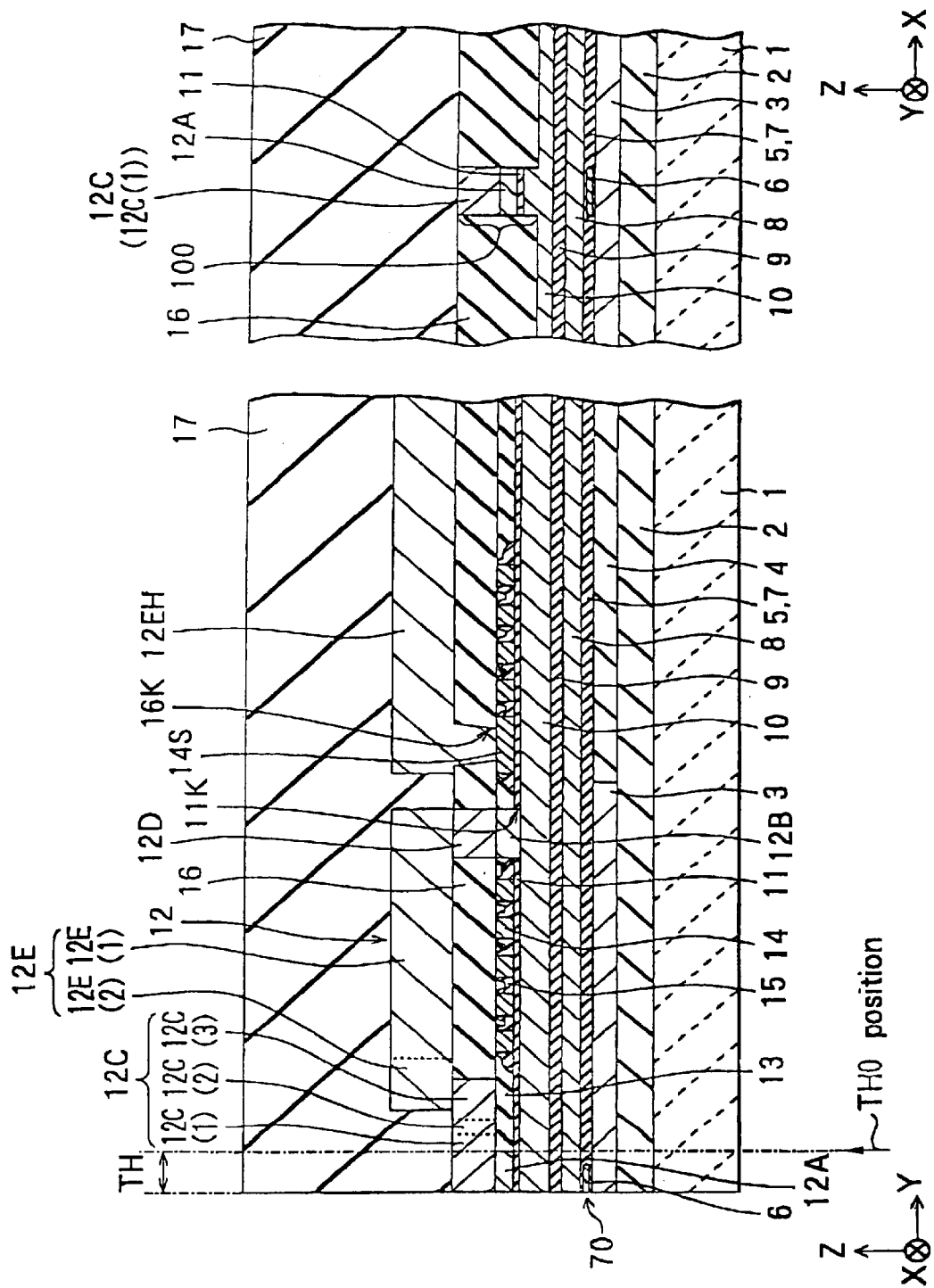
FIGS. 16A and 16B are sectional views showing a section structure of a thin film magnetic head manufactured by a method of manufacturing a thin film magnetic head as a comparative example for explaining actions relating to the method of manufacturing the thin film magnetic head according to the first embodiment of the invention.

It should be noted that if the thin film coil 14 is located in other area than the rearward area defined by the thickness of the first magnetic pole tip 12C(1), for example, if the coil 14 is embedded in the insulated film 13 of the rearward area defined by the thickness of the second magnetic pole tip 12A as shown in FIG. 16A, the thickness of the thin film coil 14 will be the same as the thickness of the second magnetic pole tip 12A at the maximum. If the thin film coil 14 is too thin, the electric resistance value will become excessive, and the quantity of the current that flows through the thin film coil 14 will decrease, which will cause decreasing the amount of the generated magnetic flux. The reduction of the amount of the generated magnetic flux will cause degradation of the overwriting characteristic.

Figures 17A, 17B:
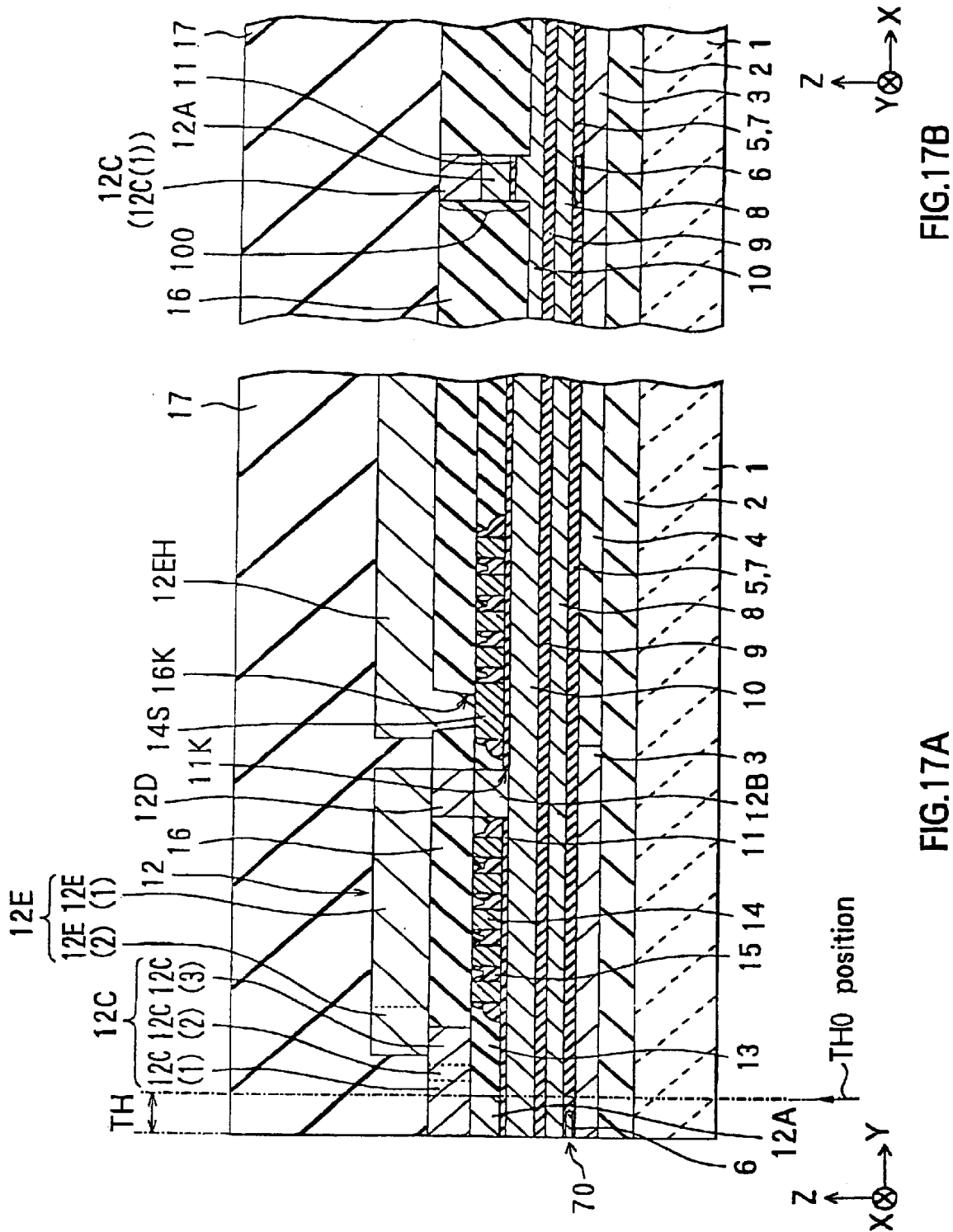
FIGS. 17A and 17B are sectional views showing a sectional structure of a thin film magnetic head manufactured by a method of manufacturing a thin film magnetic head as another comparative example for explaining the actions relating to the method of manufacturing the thin film magnetic head according to the first embodiment of the invention.

As shown in FIGS. 17A and 17B, the second magnetic pole tip 12A should be thicker than the exemplified thickness (for example, about 0.5–10 μm) in the above-described 'The method of manufacturing a thin film magnetic head' so that the thin layer coil 14 will have a suitable width (for example, about 0.8 μm or more). However, if the second magnetic pole tip 12A is thicker, it will become difficult to establish the uniform width with high accuracy. It is because the amount of etching debris will increase as the etching process to the precursory magnetic layer 112A proceeds, when the precursory-magnetic layer 112A (refer to FIGS. 4A and 4B) is thicker in order to increase the thickness of the second magnetic pole tip 12A, and a re-adhesion phenomenon of the etching debris causes substantially increasing the width of the second magnetic pole tip 12A.

On the other hand, according to the embodiment, since the thin film coil 14 is located in the rearward area defined by the thickness of the first magnetic pole tip 12C(1), the thickness of the second magnetic pole tip 12A is independent of the thickness of the thin film coil 14. That is, the thickness of the second magnetic pole tip 12A can be reduced to the adequate level, and the reduction can suppress the bad influence by the above-described re-adhesion phenomenon of etching debris and provide the uniform width of the second magnetic pole tip 12A with high accuracy. Moreover, the thin film coil 14 can have enough thickness to generate the sufficient quantity of the magnetic flux through the thin film coil 14 and provide the excellent overwriting characteristic.

Moreover, according to the embodiment, the portion having the uniform width which specifies the record track width of the recording medium has a two-layer structure (the second magnetic pole tip 12A and the first magnetic pole tip 12C(1)), thus, the throat height (TH) can be adjusted simply by changing the length of the second magnetic pole tip 12A without changing the structure of the top magnetic layer 12C constituting the propagation route of the main magnetic flux.

Furthermore, an iron-nickel-cobalt alloy is used as a material of the upper layer (the first magnetic pole tip 12C(1)) of the two-layer structure and nickel-iron is used as a material of the lower layer (the second magnetic pole tip 12A) of the above-described two-layer structure. Thus, the embodiment contributes to securing the excellent overwriting characteristic from the standpoint of the materials on the basis of the following reasons. That is, as described above, the iron-nickel-cobalt alloy used as a material of the first magnetic pole tip 12C(1) can be generally used as an etching mask utilizing the high hardness characteristic thereof, however it is difficult to control the composition structure thereof during the plating processing. If the composition structure control is not enough, the difference in the magnetic flux density may occur partially in the iron-nickel-cobalt alloy, and the difference in the propagation characteristic of the magnetic flux may also occur. On the other hand, it is comparatively easy to control the composition structure of nickel-iron used as a material of the second magnetic pole tip 12A formed by sputtering as the formation technique thereof. Thus, even if the structure of the iron-nickel-cobalt alloy changes somewhat and variation in the propagation characteristic of the magnetic flux within the first magnetic pole tip 12C(1) occurs, the smooth propagation of the magnetic flux will be surely secured in the second magnetic pole tip 12A consisting of nickel-iron of which composition structure is controlled properly, and thus the sufficient magnetic flux will reach to the tip portion thereof. Particularly, such effects may become remarkable by using a material having a larger saturation magnetic flux density such as iron nitride as a magnetic material constituting the second magnetic pole tip 12A than that of a magnetic material such as an iron-nickel-cobalt alloy constituting the top magnetic layer 12C.

Moreover, according to the embodiment, the parts constituting the top magnetic layer 12C are, in the order of descending width, the back end part 12C(3), the intermediate part 12C(2), and the first magnetic pole tip 12C(1) Thus, the magnetic volumes in these parts, i.e. the maximum permissible quantities of magnetic flux that can be held in these parts, also descend in the same order above. Thus, the magnetic flux flowing into the top magnetic layer 12C converges gradually in the propagation process from the back end part 12C(3) to the first magnetic pole tip 12C(1) according to the gradual reduction of the magnetic volumes, and saturation reduction of the magnetic flux in the propagation process of the magnetic flux is suppressed. Therefore, a sufficient quantity of the magnetic flux can be supplied to the first magnetic pole tip 12C(1) and the second magnetic pole tip 12A, which also contributes to securing the excellent overwriting characteristic.

Moreover, according to the embodiment, the magnetic materials (for example, iron nitride and the iron-nickel-cobalt alloy) having high saturation magnetic flux densities are used as materials of the second magnetic pole tip 12A and the top magnetic layer 12C. Thus, if the magnetic pole width further decreases to a highly micro level in order to increase the record density, the saturation phenomenon of the magnetic flux will be surely suppressed, and the magnetic flux will propagate smoothly. Thus, a sufficient quantity of the magnetic flux can be supplied to both tip parts with small magnetic volume of the second magnetic pole tip 12A and the first magnetic pole tip 12C(1) of the upper yoke 12C, which also contributes to securing the excellent overwriting characteristic.

Moreover, according to the embodiment, as shown in FIGS. 8A and 13, a part of the insulated film 13 is located adjacent to the write gap layer 11 in an overlap area 12R where the top magnetic layer 12C and the upper yoke 12E overlap each other. Such location will contribute to securing the excellent overwriting characteristic-for the following reasons. That is, in the propagation process of the magnetic flux flowing through the top magnetic pole 12, the downward flow of the magnetic flux passing from the connection part 12E(2) of the upper yoke 12E to the back end part 12C(3) of the top magnetic layer 12C is generated in the overlap area 12R. The part of the insulated films 13 located in the overlap area 12R will function as a shield of the magnetic flux, and prevent the flow of the magnetic flux passing from the upper area to the lower area. Thus, the magnetic flux flowing from the connection part 12E(2) into the back end part 12C(3) can be prevented from passing through the write gap layer 11 to the bottom magnetic pole 10 (magnetic flux leak). Therefore, in the propagation process of the magnetic flux in the top magnetic layer 12C, the propagation loss of the magnetic flux resulting from the 'magnetic flux leak' can be suppressed, and a sufficient quantity of the magnetic flux can be supplied respectively to both tip portions of the first magnetic pole tip 12C(1) and the second magnetic pole tip 12A. In addition, the part of the insulated film 13 can prevent the magnetic flux propagation not only from the top magnetic layer 12C to the bottom magnetic pole 10, but also from the bottom magnetic pole 10 to the top magnetic layer 12C.

According to the method of manufacturing the thin film magnetic head of the embodiment, since the second magnetic pole tip 12A is formed as a part of the precursory-magnetic layer 112A (refer to FIGS. 3A, 3B and FIG. 10) so that the edge 112AT of the back end part thereof extending in the width direction might make a linear shape, a part of the edge 112AT remains as it is and provides the back end edge of the second magnetic pole tip 12A. Thereby, the second magnetic pole tip 12A having a highly minute uniform width (for example, 0.1 $\mu$m) and having a linear back end edge can be formed. In such a case, at the back end position of the second magnetic pole tip 12A, the front end position (zero throat height position) of the insulated film 13 can be determined uniquely.

Figure 10:
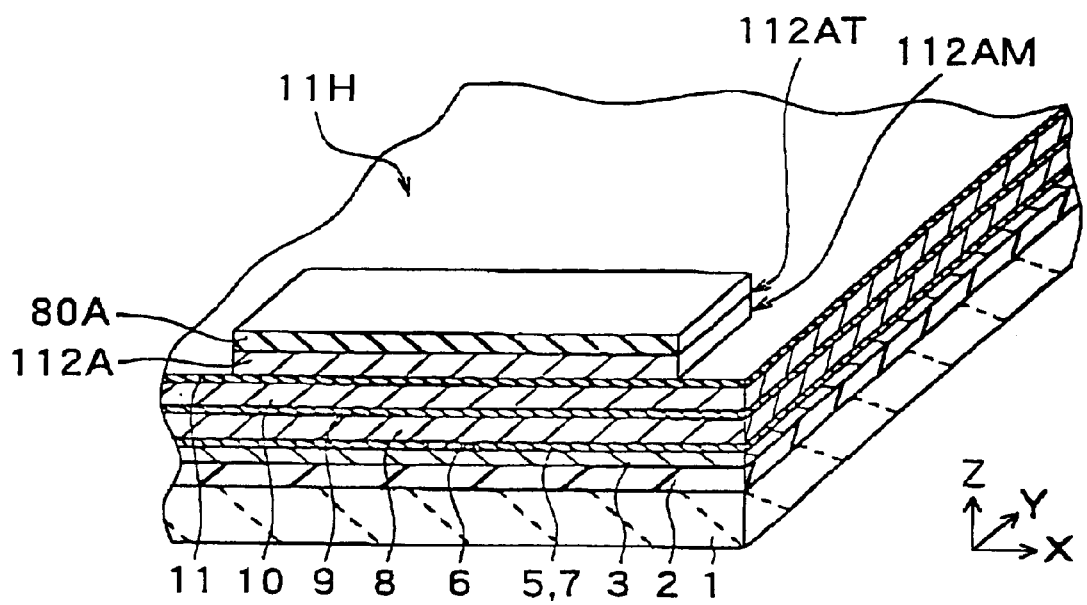
FIG. 10 is a perspective view corresponding to the sectional views shown in FIGS. 3A and 3B.

Moreover, according to the embodiment, particularly, since the RIE is used as a technique of etching the basic magnetic layer 112, the precursory-magnetic layer 112A can have a plane etching end side (the back end side 112AM) without a rounded shape (refer to FIGS. 3A, 3B and FIG. 10). Particularly, when the etching end side (the back end side 112AM) of the precursory-magnetic layer 112A become perpendicular to the flat surface 11H, the back end side 12AM (refer to FIGS. 5A, 5B and FIG. 12) of the second magnetic pole tip 12A formed as a part of the precursory-magnetic layer 112A will also become a plane and perpendicular to the flat surface 11H of the write gap layer 11. In such a case, the determination of the above-described zero throat height position will become easier.

Furthermore, the RIE used as the etching technique permits the precursory-magnetic layer 112A to be formed with higher accuracy within a shorter time than the ion milling. The RIE used as the etching technique can also provide the same effects of improving the formation accuracy and the formation time reduction to the formations of the second magnetic pole tip 12A, the bottom magnetic pole 10, the magnetic pole part 100, and the like. Particularly, proper etching conditions of the RIE etching process can further shorten the required time of forming the second magnetic pole tip 12A and the like.

Moreover, according to the embodiment, since the top magnetic layer 12C is formed on the flat surface of the write gap layer 11, the photo resist pattern for forming the top magnetic layer 12C can be formed with higher accuracy compared to formation of the equivalent on an uneven surface. Therefore, the top magnetic layer 12C can be formed with high accuracy by the frame plating method or the like.

Moreover, according to the embodiment, a magnetic material containing iron, nickel, and cobalt such as an iron-nickel-cobalt alloy (CoNiFe) is used as a material of the top magnetic layer 12C. Generally, the iron-nickel-cobalt alloy is a harder magnetic material than magnetic materials such as a Permalloy and nickel-iron, and the speed of etching the iron-nickel-cobalt alloy becomes slower than that of etching the Permalloy, iron nitride, and the like. Therefore, in the etching process for forming the pattern of the basic magnetic layer 112, the amount of the etched portion of the top magnetic layer 12C (the first magnetic pole tip 12C(1)) will be smaller than that of the basic magnetic layer 112, which prevents film decrease of the top magnetic layer 12C (the first magnetic pole tip 12C(1)). It should be noted that the thickness of the top magnetic layer 12C should be fully and necessarily secured in the formation of the top magnetic layer 12C considering the 'film decrease' in the etching process. The amount of the etched portion (the amount of film decrease) of the upper yoke (the first magnetic pole tip 12C(1)) can be controlled by changing etching conditions such as an etching gas material and a processing temperature.

In addition, it is preferred that the iron-nickel-cobalt alloy as a material of forming the top magnetic layer 12C is used, only when the thickness of the formed top magnetic layer 12C is moderately thin (for example, 3.0 μm or less). It is because if the top magnetic layer 12C having a thickness over 3.0 μm is formed of the iron-nickel-cobalt alloy, the top magnetic layer 12C may partially be broken or peeled resulted from accumulation of internal stress, and the formation of the top magnetic layer 12C may be difficult. According to the embodiment, the top magnetic layer 12C about 2.0–3.0 μm thick is formed. Thus, even if the hard magnetic material such as an iron-nickel-cobalt alloy is used, the top magnetic layer 12C can be formed surely avoiding the above-described 'breaking' or 'peeling'.

Moreover, according to the embodiment, the organic insulation material such as the photo resist having fluidity at heating is used as a material of the insulated film 15 filling between the turns of the thin film coil 14 (including the coil connection part 14S). The organic insulation material can fill between the turns of the thin film coil 14 with no space, differing from utilization of inorganic insulation materials such as alumina with no fluidity at heating, and provide absolute insulation.

Moreover, according to the embodiment, since the inorganic insulation material such as alumina is used as a material of forming the insulated film 16. The utilization can prevent the polish side of a CMP polish board from clogging and form the flatter surface after the polishing, differing from utilization of soft insulation materials such as a photo resist.

Modification of First Embodiment

Figures 18A, 18B:
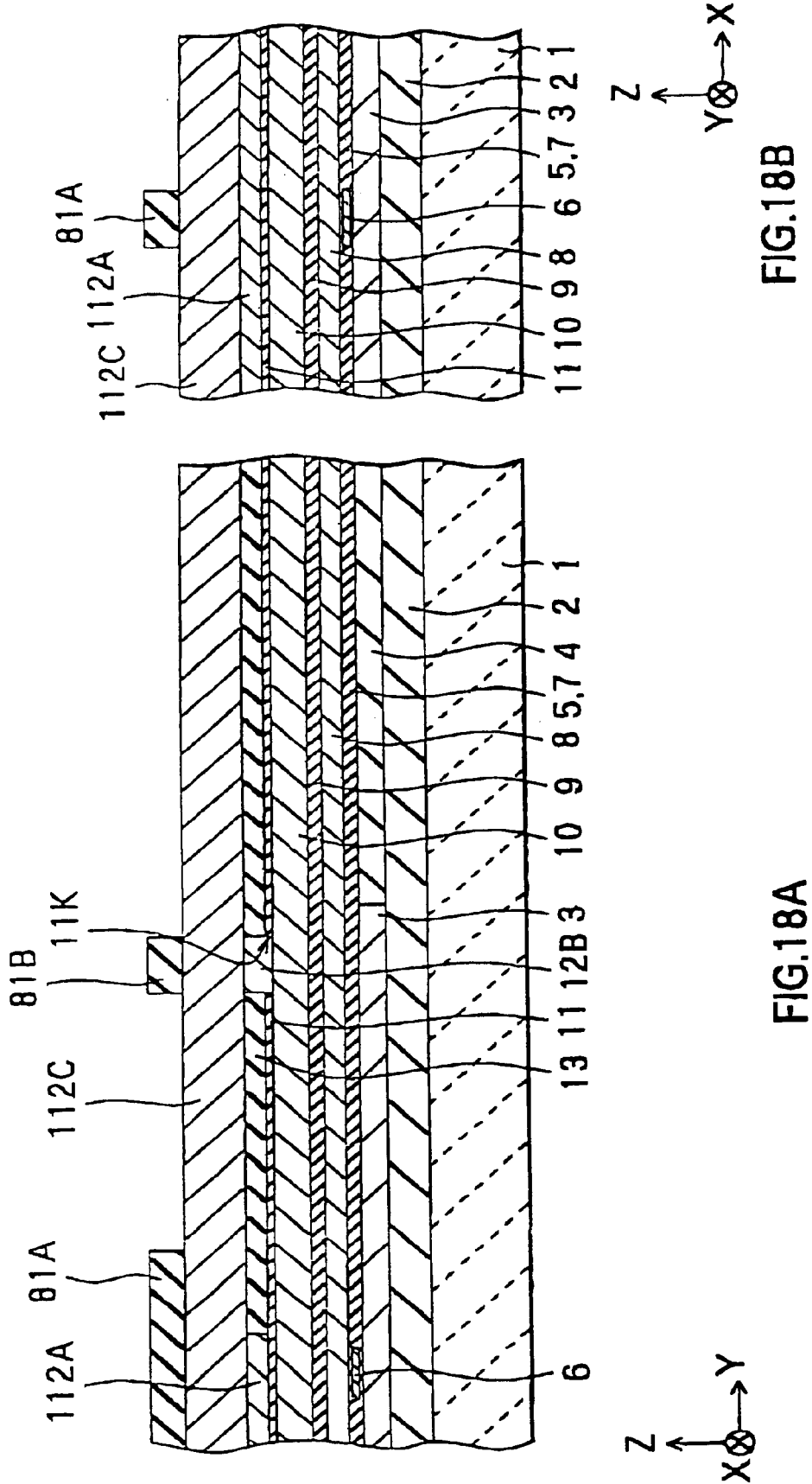
FIGS. 18A and 18B are sectional views for explaining one modified process relating to the method of manufacturing the thin film magnetic head according to the first embodiment of the invention.

In addition, although the top magnetic layer 12C and the magnetic path connection part 12D are formed using the frame plating method according to the embodiment, the formation method is not necessarily limited to the above method. For example, a sputtering and etching process can be used as well as the forming the precursory-magnetic layer 112A and the magnetic path connection part 12B as shown in FIGS. 18A, 18B, 19A and 19B. In using the sputtering and etching process, as shown in FIGS. 18A and 18B, the insulated film 13 (refer to FIGS. 4A and 4B) is first formed, and then the precursory-magnetic layer 112C about 1.5–2.5 μm thick consisting of an adequate material such as iron nitride is selectively formed by sputtering to cover the whole. And, masks 81A and 81B are selectively formed on the precursory-magnetic layer 112C using a material and a method similar to those of the masks 80A and SOB for forming the precursory-magnetic layer 112A and the like in the above-described embodiment. The masks 81A and 81B are formed to have a plane shape respectively corresponding to the plane shape of the top magnetic layer 12C and the magnetic path connection part 12B. Then, the precursory-magnetic layer 112C is etched by an adequate method such as the RIE using the masks 81A and 81B to form a pattern, so that the top magnetic layer 12C and the magnetic path connection part 12D are formed selectively as shown in FIG. 19A. When the precursory-magnetic layer 112C is etched by RIE, for example, an etching gas containing chlorine and the like is used and the processing temperature is within a range of 50–300° C. as in the formation of the second magnetic pole tip 12A in the above described embodiment. Thereby, the top magnetic layer 12C and the magnetic path connection part 12D can be formed with high accuracy and within a short time In addition, when etching process is completed, the masks 81A and 81B may remain (refer to FIGS. 19A and 19B), or not. Even in the case that the masks 81A and 81B remain, the masks are polished and removed in the polish process for forming the insulated film 16 (refer to FIGS. 6A, 6B, 7A and 7B). The precursory-magnetic layer 112C used herein corresponds to one example of a 'magnetic material layer' in the invention.

Figures 20A, 20B:
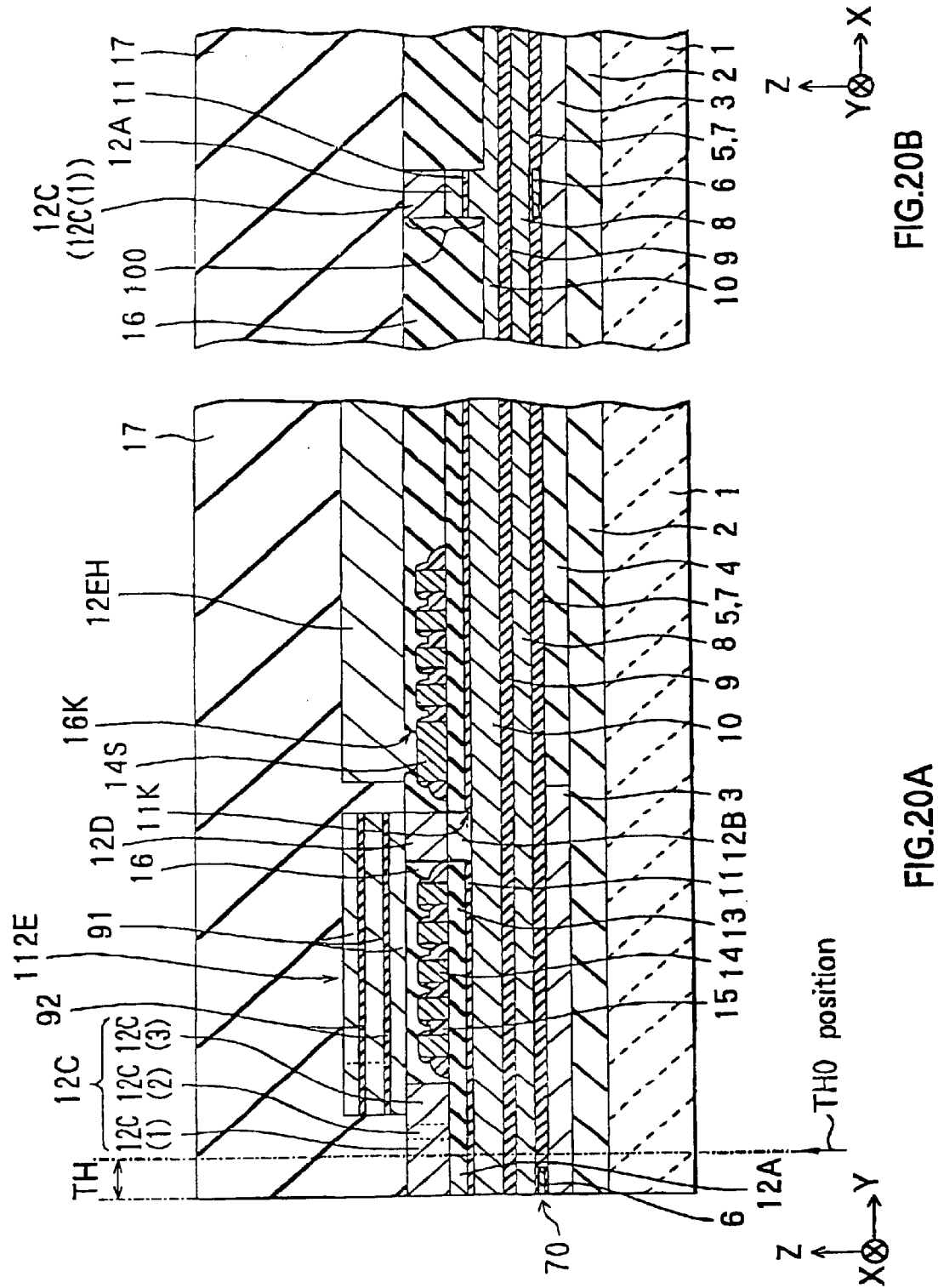
FIGS. 20A and 20B are sectional views showing a modification relating to the structure of the thin film magnetic head according to the first embodiment of the invention.

Moreover, although it is explained in the embodiment that the upper yoke (12E) has a single layer structure of iron nitride (refer to FIG. 8A), the structure of the upper yoke is not necessarily limited to the above structure. For example, as shown in FIGS. 20A and 20B, the upper yoke may have an interleaved multilayer structure (112E) of a high saturation magnetic flux density material layer 91 such as iron nitride and an inorganic insulation material layer 92 such as alumina. The upper yoke having such structure can prevent an occurrence of an eddy current in the magnetic path and improve a high frequency characteristic. In addition, the time for forming the above-described high saturation magnetic flux density material layer 91 and the inorganic insulation material layer 92 can be shortened by using the RIE.

All the portions except the upper yoke 112E in FIG. 20A are the same as those in the above-described FIG. 8A.

Moreover, although the iron-nickel-cobalt alloy is used as a material of forming the top magnetic layer 12C according to the embodiment, the material is not necessarily limited to the above one. For example, a Permalloy (for example, a composition of 46 wt-% of nickel and 55 wt-% of Fe), iron nitride, or an amorphous alloy (for example, cobalt-iron alloy) may be used. It should be noted that in order to suppress the amount of film decrease of the top magnetic layer 12C which functions as a mask for forming the pattern of the precursory-magnetic layer 112A, as described in the above embodiment, it may be suitable to use the iron-nickel-cobalt alloy as a material of forming the top magnetic layer 12C.

Moreover, although iron nitride or amorphous alloys (cobalt-iron alloy and the like) as a material of forming the basic magnetic layer 112 (the second magnetic pole tip 12A) are used according to the embodiment, the materials are not necessarily limited to the above those. For example, a Permalloy (for example, a composition of 45 wt-% of nickel and 55 wt-% of Fe) or a magnetic material containing iron, nickel, and cobalt (for example, the iron-nickel-cobalt alloy) may be used. It should be noted that in order to adequately control the composition of the basic magnetic layer 112 and to secure good propagation of the magnetic flux inside the finally formed second magnetic pole tip 12A, it is preferred that iron nitride or the amorphous alloys are used as a material of forming the basic magnetic layer 112. In addition, the method of forming the basic magnetic layer 112 is not necessary limited to the sputtering and etching process, for example, the frame plating method may be used.

Moreover, although the basic magnetic layer 112 is formed and then the precursory-magnetic layer 112A is formed by etching the basic magnetic layer 112 and forming the pattern according to the embodiment, the formation method is not necessarily limited to the above one. For example, the precursory-magnetic layer 112A may be formed using the frame plating method instead of the etching process. Even in the case of using the frame plating method, the edge 112AT of the back end part of the precursory-magnetic layer 112A extending in the width direction should have the linear shape.

Moreover, according to the embodiment, magnetic materials having a high saturation magnetic flux density are respectively used as materials of the basic magnetic layer 112 (second magnetic pole tip 12A) and the top magnetic layer 12C. The saturation magnetic flux density of a magnetic material used in order to form each of the above-described parts can be set to a desired value Specifically, for example, two kinds of magnetic materials having equal saturation magnetic flux density or different saturation magnetic flux density from each may be used as a material of each part. In either of the cases, the similar effects as the above-described embodiment can be acquired. It should be noted that it is preferred that when the magnetic materials having a different saturation magnetic flux density from each is used, it may be preferred that the saturation magnetic flux density of the magnetic material constituting the basic magnetic layer 112 become larger than that of the magnetic material constituting the top magnetic layer 12C for the following reasons That is, generally, operations of the thin film magnetic head (for example, information recording and the like) will be performed by the action of the magnetic flux passing through the second magnetic pole tip 12A which is neighboring to the write gap layer 11 rather than the first magnetic pole tip 12C(1) of the top magnetic layer 12C. Therefore, in the case of using the two kinds of the magnetic materials having a different saturation magnetic flux density from each, in a uniform width portion (i.e. the second magnetic pole tip 12A and the first magnetic pole tip 12C(1)) which specifies the record track width of the recording medium, the magnetic flux distribution state (hereinafter referred a 'magnetic flux density profile') should be constructed so that the saturation magnetic flux density of the second magnetic pole tip 12A as a lower layer area may become larger than that of the first magnetic pole tip 12C(1) as an upper area. Conversely, it will become possible to adjust the magnetic flux density profile of the uniform width portion to a desired value by constituting the uniform width portion having the two-layer structure using selectively two kinds of magnetic materials having a different saturation magnetic flux density.

Moreover, although the sputtering and etching process is used as a method of forming the bottom magnetic pole 10 according to the embodiment, the formation method is not necessarily limited to the above one. For example, the frame plating method can be used to form each part and the like. In such a case, for example, a Permalloy having a composition of 80 wt-% of nickel and 20 wt-% of Fe, or 45 wt-% of nickel and 55 wt-% of Fe, and the like, or a magnetic material containing iron, nickel, and cobalt (for example, an iron-nickel-cobalt alloy) may used as a material of forming the bottom magnetic pole 10.

Moreover, although the electrolysis plating method is used as a method of forming the lower shield layer 3 and the upper shield layer 8 according to the embodiment, the formation method is not necessarily limited to the above one. For example, a method similar to the formation method of the bottom magnetic pole 10 and the like, i.e. the sputtering and etching process, may be used for forming either or both layers. In such a case, in addition to the above Permalloy, iron nitride, the amorphous alloy (for example, a cobalt-iron alloy, a zirconium-cobalt-iron-oxygen alloy, a zirconium-iron-nitrogen), and the like may be used as a material of forming these parts. The application of the method of forming the bottom magnetic pole 10 and the like permits the above-described parts and the like to be formed accurately within a very short time and will contribute to developments of manufacturing the thin film magnetic head in the respect of shortening the whole manufacturing time.

Moreover, although the photo resist is used as a material of forming the insulated film 15 according to the embodiment, the material is not necessarily limited to the above one. For example, polyimide resins, SOG (Spin on glass), and the like which have fluidity at heating like the photo resist. Also in such a case, the effects similar to those of the above-described embodiment can be acquired.

Moreover, although the insulated film 15 is formed by embedding the photo resist fluidized by heat-treatment between the turns of the winding of the thin film coil 14 according to the embodiment, the formation method is not necessarily limited to the above one. For example, the insulated film 15 consisting of alumina may be formed using a CVD (Chemical Vapor Deposition) method. The CVD method does not have complicated processes such as a heat-treatment and can easily embed alumina between turns of the winding of the thin film coil 14. When the insulated film 15 consisting of alumina is formed using the CVD method, the insulated film 15 may serve as the insulated film 16 formed in the later process. In such a case, some processes may be eliminated from the manufacturing process compared to the case where the insulated films 15 and 16 are formed at discrete processes.

Moreover, although the sputtering is used as a formation method of the write gap layer 11 and alumina is used as a material of the write gap layer 11 according to the embodiment, the embodiment is not necessarily limited to the above material and the method. For example, in addition to alumina, an inorganic insulation material such as aluminum nitride (AlN), silicon oxide, and silicon nitride, or a non-magnetic metal such as tantalum (TA), titanium-tungsten (WTi), and titanium nitride (TiN) may be used as a material of forming the write gap layer 11. Moreover, the CVD (Chemical Vapor Deposition) in addition to the sputtering may be used as the method of forming the write gap layer 11. The formation of the write gap layer 11 using such a method can prevent a pinhole and the like from being generated in the gap layer and avoid a magnetic flux leak from the write gap layer 11. These effects are particularly beneficial when the thickness of the write gap layer 11 decreases.

Moreover, although the coil connection part 14S is located in the inside end part of the thin film coil 14 according to the embodiment, the coil connection part 14S is not necessarily limited to the above the location and may be located, for example, in the outside end part of the thin film coil 14. Also in such a case, the effects similar to those of the above-described embodiment can be obtained by locating the coil connection wiring 12CH to be connected with the coil connection part 14S.

Second Embodiment

The second embodiment of the invention will be explained below.

Figure 26:
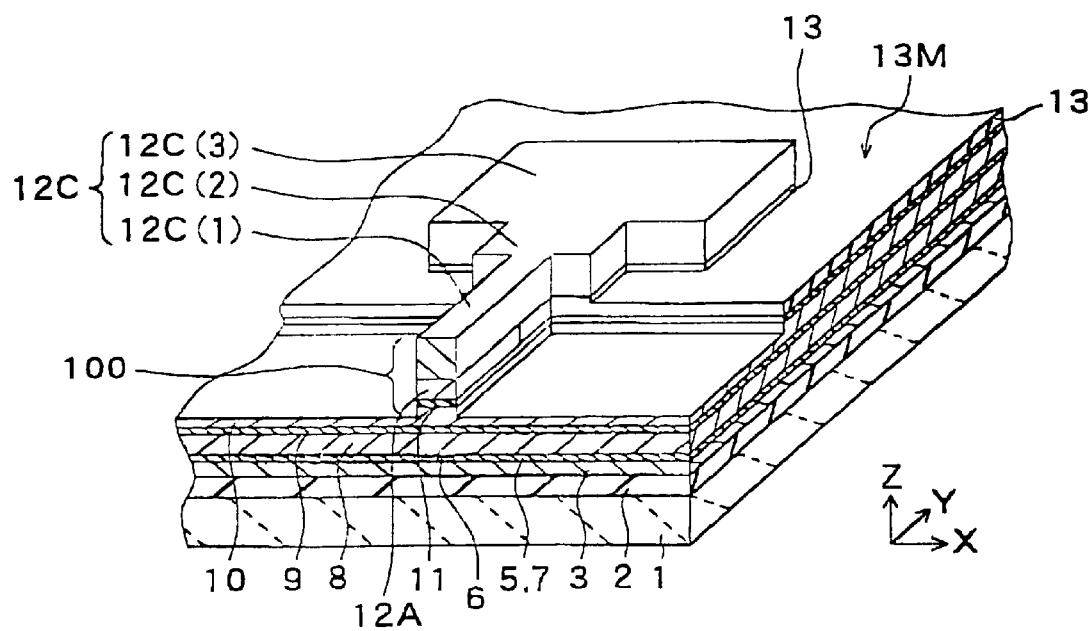
FIG. 26 is a perspective view corresponding to the sectional views shown in FIGS. 21A and 21B.
Figure 27:
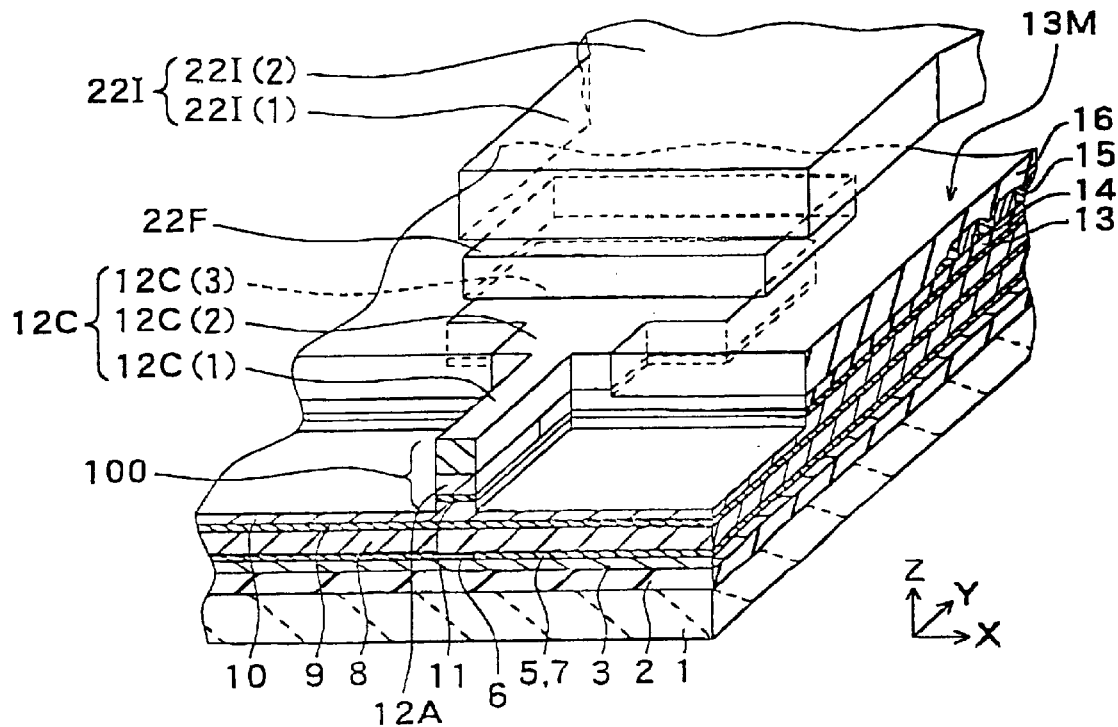
FIG. 27 is a perspective view corresponding to the sectional views shown in FIGS. 24A and 24B.

First, with reference to FIGS. 21A and 21B to FIGS. 25A and 25B, FIG. 26 and FIG. 27, a method of manufacturing a composite type thin film magnetic head as a method of manufacturing a thin film magnetic head according to the second embodiment of the invention is explained Each of FIG. 21A to FIG. 25A shows a section perpendicular to an air bearing surface, and each of FIGS. 21B to 25B shows a section parallel to the air bearing surface of a magnetic pole portion. FIGS. 26 and 27 are perspective views of structures corresponding to main manufacturing processes. FIG. 26 corresponds to the section shown in FIGS. 21A and 21B, and FIG. 27 corresponds to the section shown in FIGS. 24A and 24B. An overcoat layer 27 and some portions in FIGS. 24A and 24B have been left out of FIG. 27. In addition, in each of FIGS. 21A and 21B to FIG. 27, representations of the directions of X-, Y-, and Z-axis are the same as those of the first embodiment, and the same reference marks and numbers will be given to the same composition elements in each Figure as those in the first embodiment.

In the method of manufacturing the thin film magnetic head according to the embodiment, the processes until an top magnetic layer 12C and a magnetic path connection part 12D have been formed as shown in FIGS. 21A and 21B are similar to the processes shown in FIGS. 4A and 4B in the first embodiment, and the explanation of these processes has been left out herein.

According to the embodiment, after forming the top magnetic layer 12C and the magnetic path connection part 12D, the whole surface is etched by an adequate method such as RIE using the top magnetic layer 12C and the magnetic path connection part 12D as a mask. During the RIE etching process, a part of the insulated films 13 in a rearward area (except for the formation area of the magnetic path connection part 12D) behind the top magnetic layer 12C are removed and dug down by adjusting etching conditions. As shown in FIGS. 21A, 21B and FIG. 26, the second magnetic pole tip 12A and the magnetic pole portion 100 are formed like the first embodiment and a recessed area 13M is formed on the part of the insulated film 13 by the etching process. The depth of the recessed area 13M is set to be about 0.5–1.5 μm, for example. Etching conditions for forming the second magnetic pole tip 12A and the magnetic pole portion 100 (an etching gas material, a processing temperature, and the like) are the same as those of the first embodiment, for example. The etching conditions are adjusted so that the amount of the etched portion of the top magnetic layer 12C and the like may become less than that of the circumference area thereof to prevent the thickness of the top magnetic layer 12C and the like from decreasing.

Figures 22A, 22B:
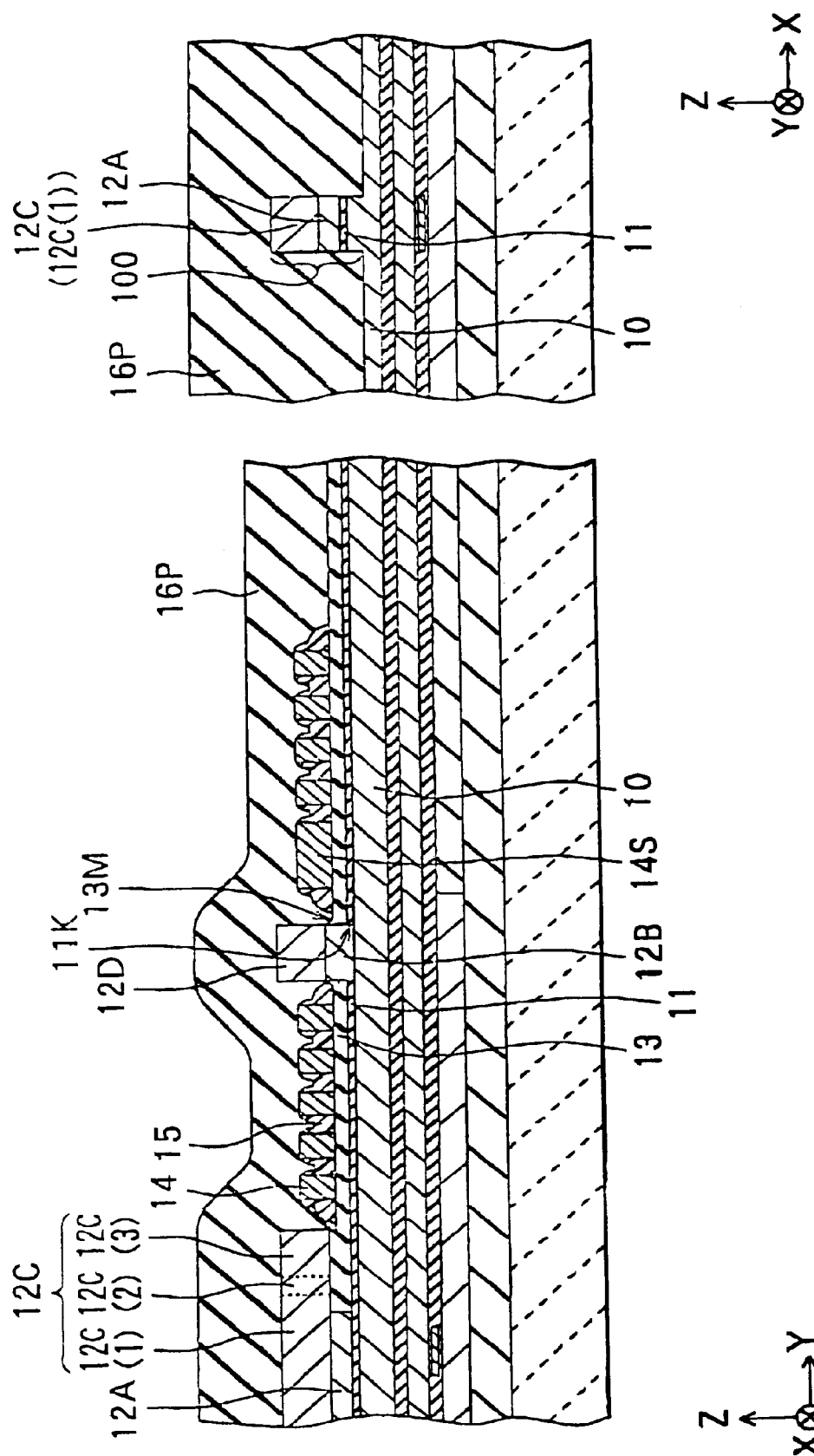
FIGS. 22A and 22B are sectional views for explaining a process following the process shown in FIGS. 21A and 21B.

Then, as shown in FIG. 22A, after forming a thin film coil 14 in the recessed area 13M, an insulated film 15 and a precursory-insulating layer 16P are formed in this order. The recessed area 13M is formed in the previous process, thus the level of the thin film coil 14 is lower compared to the case where the recessed area 13M is not formed.

Then, the whole surface of the precursory-insulating layer 16P is polished and flattened by an adequate method such as a polish processing. An insulated film 16 is formed to embed the thin film coil 14 and the like by the polish processing as shown in FIG. 23. The polish processing will be continued until at least both of the precursory-magnetic layer 112A and magnetic path connection part 12B are exposed.

Then, as shown in FIGS. 23A and 23B, the insulated film 16 covering an upper part of a coil connection part 14S is partially etched with an adequate method such as a RIE or an ion milling to form an opening 16K for connecting the coil connection part 14S with a coil connection part 24S formed in the later process.

Figure 28:
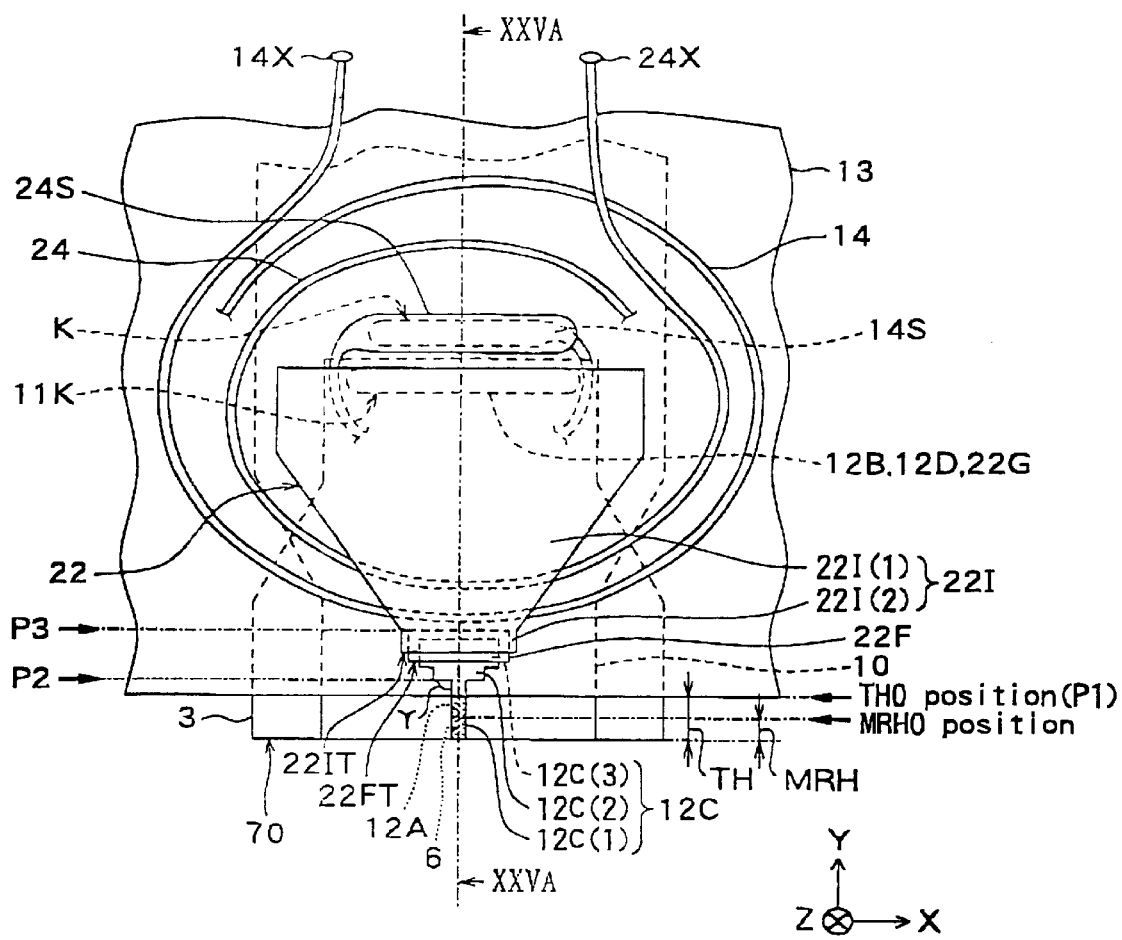
FIG. 28 is a plane view showing a plane structure of the thin film magnetic head according to the second embodiment of the invention.

Then, as shown in FIG. 23A, an intermediate connection part 22F about 1.5–2.5 μm thick constituting a part of an top magnetic pole 22, are selectively formed on the flat area from the insulated film 16 to a back end part 12C(3) of the top magnetic layer 12C. For example, the intermediate connection part 22F is formed so that the front end thereof may be located behind a connection position of the intermediate part 12C(2) and the back end part 12C(3) in the top magnetic layer 12C and the back end thereof may be located on the outermost winding of the thin film coil 14. For example, the intermediate connection part 22F may be formed to have a plane shape as shown in FIG. 28 described later. The structural characteristics of the intermediate connection part 12C will be described later. When the intermediate connection part 22F is formed, a magnetic path connection part 22G constituting a part of the top magnetic pole 22 is also formed on the magnetic path connection part 12D at the same time. Materials, methods, and the like for forming the intermediate connection part 22F and the magnetic path connection part 22G are the same as those for forming the top magnetic layer 12C and the magnetic path connection part 12D in the first embodiment. The intermediate connection part 22F overlaps and contacts partially with a part of the back end part 12C(3) of the top magnetic layer 12C, and both are connected magnetically. The intermediate connection part 22F herein used correspond to one example of a 'fourth magnetic layer portion' in the invention.

Then, as shown in FIG. 23A, a thin film coil 24 about 0.8–1.5 μm thick consisting of an adequate material such as copper for an inductive recording head is selectively formed on the flattened insulated film 16 above the thin film coil 14 by an adequate method such as an electrolysis plating method. When the thin film coil 24 is formed, for example, a coil connection part 24S which is an end part of the inner side of the coil 24 is formed on the coil connection part 14S in the opening 16k as an integral part of the thin film coil 24 at the same time. The thin film coil 14 and the thin film coil 24 are connected through the coil connection parts 14S and 24S in the opening 16K. The thin film coil 24 used herein corresponds to one example of a 'second thin film coil' in the invention, and the thin film coils 14 and 24 herein used correspond to one example of a 'thin film coil' in the invention.

Then, as shown in FIG. 23A, an insulated film 25 for insulation between turns of the winding of the thin film coil 24 and the like is formed. Materials, methods, structural characteristics, and the like of the insulated film 25 are similar to those of the insulated film 15 in the first embodiment.

Then, an insulated material, for example a precursory-insulating layer 26P, about 3.0–4.0 μm thick is formed to cover the whole as shown in FIG. 23 by an adequate method such as a sputtering and to embed the uneven structure area consisting of the intermediate connection part 22F, the magnetic path connection part 22G, the thin film coil 24, and the coil connection part 24S and the like.

Figures 24A, 24B:
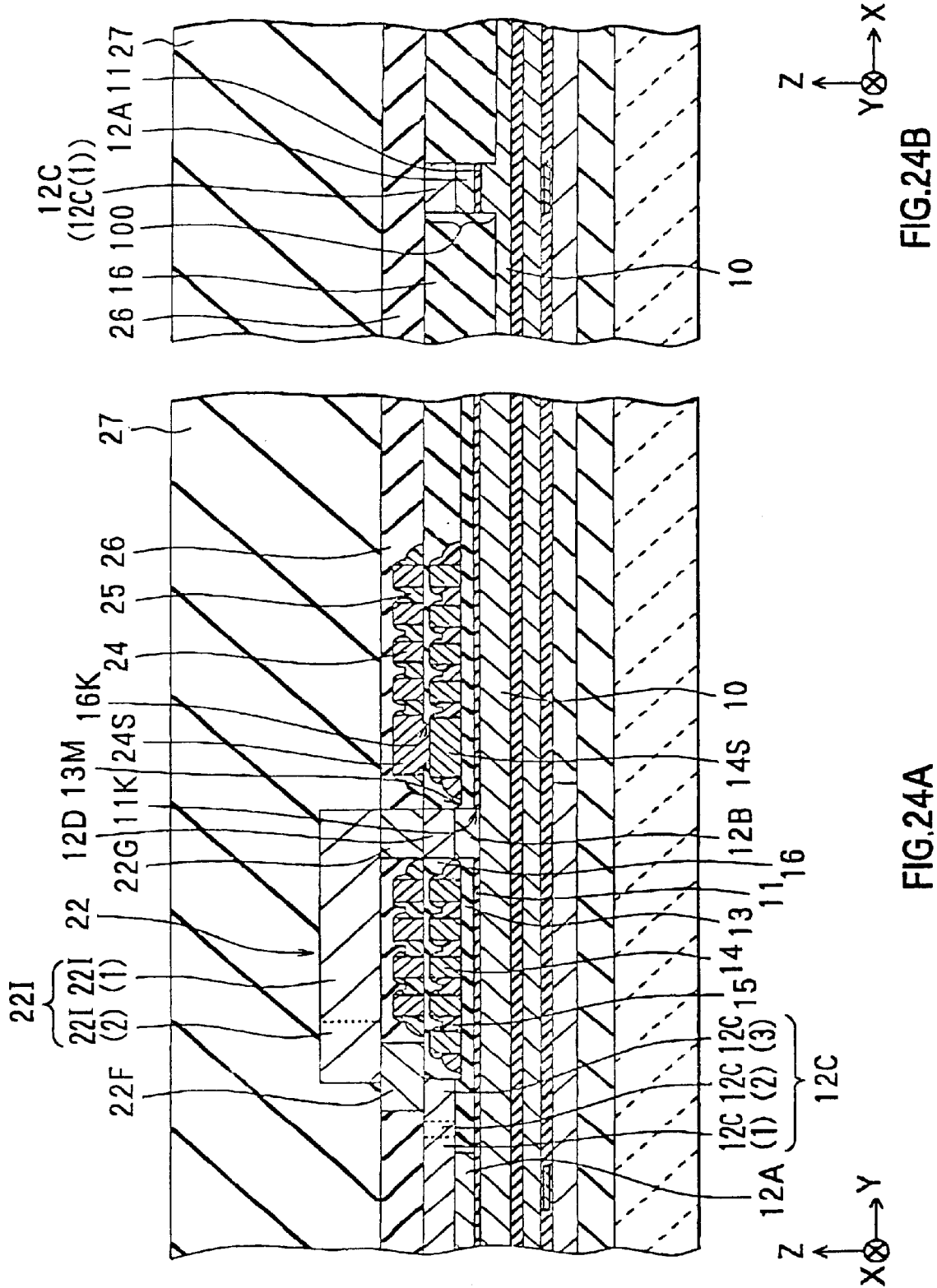
FIGS. 24A and 24B are sectional views for explaining a process following the process shown in FIGS. 23A and 23B.

Then, the whole surface of the precursory-insulating layer 26P is polished and flattened by an adequate method such as a CMP method. An insulated film 26 embedding the thin film coil 24 and the like is formed by the polish processing as shown in FIGS. 24A and 24B. The polish processing will be continued until at least both of the intermediate connection part 22F and the magnetic path connection part 22G are exposed The insulated films 13, 15, 16, 25, and 26 herein used correspond to one example of an 'insulating layer' in the invention.

Then, as shown in FIG. 24A, an upper yoke 22I about 2.0–3.0 μm thick constituting a part of the top magnetic pole 22 is selectively formed on the flat area from the intermediate connection part 22F to the magnetic path connection part 22G. Materials and methods of forming the upper yoke 22I are similar to those of the upper yoke 22I in the first embodiment. For example, the upper yoke 22I may be formed to have a plane shape as shown in FIG. 28 described later While the back portion of the upper yoke 22I is magnetically connected with a bottom magnetic pole 10 via the magnetic path connection parts 12B, 12D, and 22G through the opening 11K, the forward portion is magnetically connected with the second magnetic pole tip 12A through the intermediate connection part 22F and the top magnetic layer 12C. That is, the connection between the top magnetic pole 22 (i.e. the second magnetic pole tip 12A, the top magnetic layer 12C, the magnetic path connection parts 123, 12D, and 22G, the intermediate connection part 22F, and the upper yoke 22I) and the bottom magnetic pole 10 forms a magnetic path. The structural characteristics of the upper yoke 22I will be described later. The upper yoke 22I used herein corresponds to one example of a 'third magnetic layer portion' in the invention. Moreover, the top magnetic pole 22 comprising the second magnetic pole tip 12A, the top magnetic layer 22C, the magnetic path connection parts 12B, 12D, and 22G, the intermediate connection part 22F, and the upper yoke 22I used herein corresponds to one example of a 'first magnetic layer' in the invention.

Then, as shown in FIGS. 24A and 24B, the overcoat layer 27 about 20–40 μm thick consisting of an insulated material, for example, an inorganic insulation material such as alumina is formed to cover the whole. The upper yoke 22I circumference has a structure as shown in FIG. 27.

Finally, as shown in FIGS. 25A and 25B, an air bearing surface 70 of the recording head and the reproducing head is formed by means of a machining or a polish process, and the thin film magnetic head is completed.

FIG. 28 is a schematic view of a plane structure of the thin film magnetic head manufactured by the method of manufacturing the thin film magnetic head according to the embodiment. The same reference marks and numbers will be given to the same composition elements in FIG. 28 as those in FIG. 15 of the first embodiment. The insulated films 15, 16, 25, and 26, the overcoat layer 27, and some elements have been left out of FIG. 28. Moreover, a part of the outermost periphery of the thin film coil 24 is illustrated. FIG. 25A shows a cross section taken along the line XXVA—XXVA in FIG. 28. In addition, representations of the directions of X-, Y-, and Z-axis are the same as those of FIGS. 21A and 21B to FIGS. 25A and 25B, FIG. 26 and FIG. 27.

For example, the top magnetic pole 22 is constituted by the second magnetic pole tip 12A, the top magnetic layer 12C, the magnetic path connection parts 12B, 12D, and 22G, the intermediate connection part 22F, and the upper yoke 22I which are formed separately as described above.

For example, the upper yoke 22I has the structural characteristics similar to those of the upper yoke 12E of the first embodiment, and includes the yoke part 22I(1) and the connection part 22I(2) respectively corresponding to the yoke part 12E(1) and the connection part 12E(2) of the upper yoke 12E. The connection part 22I(2) may be wider than the intermediate connection part 22F. Both width are not necessarily limited to the above described and the connection part 22I(2) may be narrower than the intermediate connection part 22F, or both widths may be the same.

For example, the intermediate connection part 22F may have a rectangle plane shape and may be wider or narrower than the back end part 12C(3) of the top magnetic layer 12C, or both widths may be the same. The second magnetic pole tip 12A, the top magnetic layer 12C, the intermediate connection part 22F, and the upper yoke 22I are coaxial in the width direction.

Both a terminal 14X being the outside end part of the thin film coil 14 and a terminal 24X being the outside end part of the thin film coil 24 connect with an external circuit (not shown) to energize the thin film coils 14 and 24 through the external circuit.

In addition, the structural characteristics of composition elements except the above elements shown in FIG. 28 are similar to those of the first embodiment (refer to FIG. 15).

According to the embodiment, a part of the insulated films 13 is etched and dug down to form the recessed area 13M and the thin film coil 14 is located in the recessed area 13M, so that the level of the surface of a under layer where the thin film coil 14 is formed becomes lower compared to the case where the under layer surface is not etched. Therefore, since a space available to increase the thickness of the thin film coil 14 will be secured above the thin film coil 14, and the thin film coil 14 can be thicker than the first embodiment.

Furthermore, lowering the level of the under layer surface for forming the thin film coil 14 can suitably secure the thickness of the insulated film 16 above the thin film coil 14 and thin the thickness of the top magnetic layer 12C. In such a case, the top magnetic layer 12C consisting of the iron-nickel-cobalt alloy can be formed surely without peeling or breaking on the same reason as described in the first embodiment.

Moreover, according to the embodiment, the intermediate connection part 22F is formed on the flat side after the CMP polish, thus the intermediate connection part 22F can be formed with high accuracy by the same action as the case where the top magnetic layer 12C is formed on the flat side in the first embodiment. In addition, the effects relating to the formation accuracy of the intermediate connection part 22F are similar to those of the formation of the upper yoke 22I.

It should be noted that actions, effects, modifications, and the like relating to the method of manufacturing the thin film magnetic head according to the embodiment except the above described ones are similar to those of the first embodiment, and these explanations have been left out herein.

As described above, although the invention has been described by some embodiments, the embodiments are not meant to limit the scope of the invention and various modifications are possible. Materials, manufacturing methods, sizes, and other factors relating to the thin film magnetic head of the invention are not necessarily limited to the ones above.

Although the methods of manufacturing a composite type thin film magnetic head are described in the above-described embodiments and modifications thereof, the invention may be applicable also to thin film magnetic recording heads having an inductive magnetic transducer for writing and thin film magnetic heads having an inductive magnetic transducer for both recording and reproducing. Moreover, the invention may be applicable also to thin film magnetic heads having a structure where reading elements and writing elements are laminated in the reverse order.

Moreover, each of magnetic layer portions (the upper pole tips, the intermediate connection parts, the upper yokes, and so on) constituting the top magnetic pole shown in the above-described embodiments may have a desired shape as well as the plane shape as shown in FIG. 15 or FIG. 28, as long as they can provide suitably a magnetic volume of each magnetic layer portion and supply sufficiently a magnetic flux generated by the thin film coil to the end of the tips.

Moreover, although it has been described that the thin film magnetic head has the coil structure of one layer or two layers according to each above-described embodiment, the number of layers of the thin film coil in each embodiment can be changed suitably. Increasing the number of layers of the thin film coil can increase the amount of generating a magnetic flux.

Moreover, although it has been described that the portion having the uniform width of the top magnetic poles 12 which specifies the record track width of the recording medium has a two-layer structure (the second magnetic pole tip 12A and the first magnetic pole tip 12C(1)) in the first embodiment, the portion is not necessarily limited to the above structure and may have a multilayer structure of three or more layers. Also in such a case, the effects similar to those of the first embodiment can be acquired. Particularly, when two or more magnetic materials which respectively have a different magnetic flux density is used as a material of forming each part constituting the second magnetic pole tip, it is desirable to adjust the magnetic flux density profile so that the magnetic flux densities may increase in the order from the upper layer to the lower layer of the portion having the uniform width as described above It is also possible to adjust suitably the magnetic flux density profile of the portion having the uniform width. In addition, the above-described modifications of the structure of the portion having the uniform width are also applicable to the second embodiment.

Figures 29A, 29B:
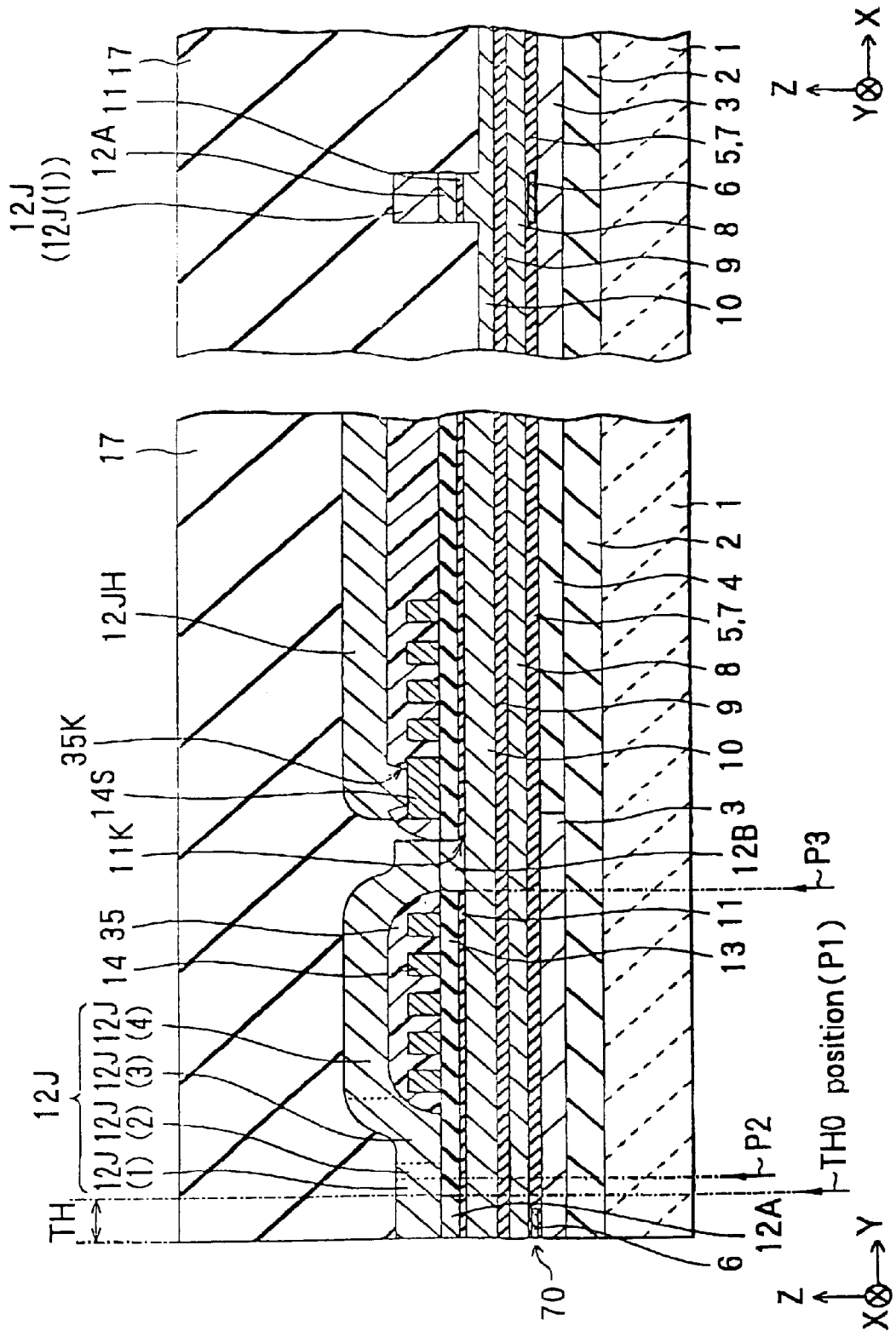
Figure 30:
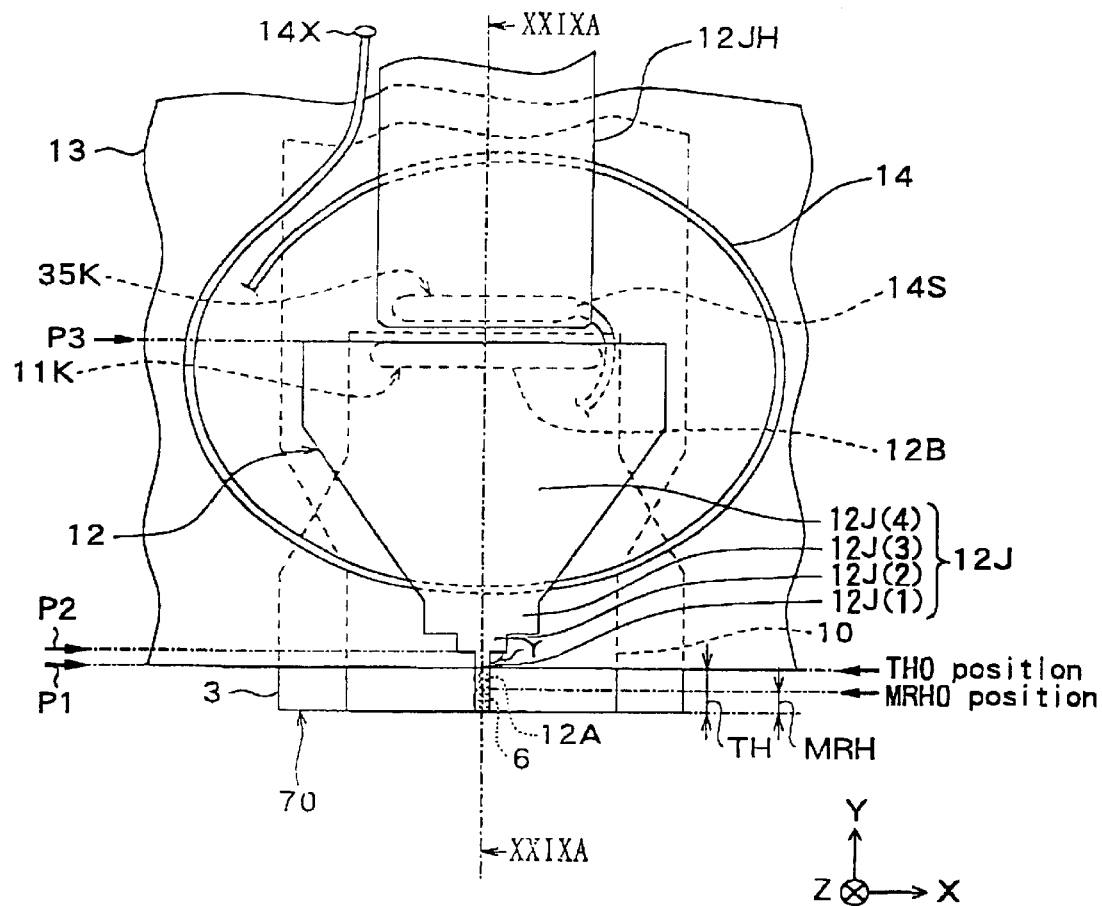
FIG. 30 is a plane view corresponding to the sectional views shown in FIGS. 29A and 29B.

Moreover, although a portion of the top magnetic pole 12 except the second magnetic pole tip 12A and the magnetic path connection part 12B, is divided into three parts (i.e. the top magnetic layer 12C, the magnetic path connection part 12D, and the upper yoke 12E) in the first embodiment as shown in FIG. 8, these parts are not necessarily limited to the above structure and may be integrally formed as one part as shown in FIGS. 29A and 30. FIG. 30 shows a plane structure as such a modification of the structure of the thin film magnetic head according to the first embodiment, and FIGS. 29A and 29B show cross sections taken along the line XXIXA—XXIXA in FIG. 30. FIGS. 29A and 29B respectively correspond to FIGS. 8A and 8B, and FIG. 30 corresponds to FIG. 16. The insulated film 35 and some parts in FIGS. 29A and 29B have been left out of FIG. 30

Instead of the top magnetic layer 12C, the magnetic path connection part 12D, and the upper yoke 12E, the thin film magnetic head shown in FIGS. 29A, 29B and 30 comprises an top magnetic layer 12J located on the area from the second magnetic pole tip 12A to the magnetic path connection part 12D to cover an apex part consisting of the insulated film 35 (for example, a photo resist) covering the thin film coil 14 and some parts. The top magnetic layer 12J comprises a first magnetic pole tip 12J(1), an intermediate part 12J(2), a back-end part 12J(3) and a yoke part 12J(4) in the order from the air bearing surface 70 For example, the first magnetic pole tip 12J(1), the intermediate part 12J(2), and the back end part 12J(3) have the structural characteristics similar to those of the first magnetic pole tip 12C(1), the intermediate part 12C(2) and back end part 12C(3) of the top magnetic layer 12C respectively, and the yoke part 12J(4) has the structural characteristics similar to those of the yoke part 12E(1) of the upper yoke 12E. A connection position P2 (a second position) between the first magnetic pole tip 12J(1) and the intermediate part 12J(2) is behind the position P1 (the first position) of the back end of the second magnetic pole tip 12A, and a position P3 (a third position) of the back end of the yoke part 12J(4) corresponds to the back end position of the magnetic path connection part 12B. The back portion of the top magnetic layer 12J is magnetically connected with the bottom magnetic pole 10 through the magnetic path connection part 12B and is also magnetically connected with the second magnetic pole tip 12A. A coil connection wiring 12JH has the structural characteristics similar to those of the coil connection wiring 12CH of the first embodiment. Materials, methods, and the like of these parts such as the top magnetic layer 12J are similar to those of the top magnetic layer 12C in the first embodiment. The tip part 12J(1) used herein corresponds to one example of a 'uniform width portion' in the invention. The intermediate part 12J(2), the back end part 12J (3), and the yoke part 12J(4) used herein correspond to one example of an 'widend portion' in the invention. And the top magnetic layer 12J herein used corresponds to one example of a 'first magnetic layer portion' in the invention.

The construction of the thin film magnetic head including the top magnetic layer 12J can decrease the number of processes of manufacturing the thin film magnetic head, compared to the first embodiment where the top magnetic layer 12C, the magnetic path connection part 12D, and the upper yoke 12E are formed separately. Other details in structures, effects, and the like of the thin film magnetic head shown in FIGS. 29A, 29B and FIG. 30 are similar to those of the first embodiment. The modifications of the structure of the above top magnetic poles 12 are also applicable to the second embodiment.

As described above, according to the thin film magnetic head or the method of manufacturing the same of the present invention, the thin film coil comprises the first thin film coil located so that most thereof might be included in the space defined by the thickness of the uniform width portion of the first magnetic layer portion. Thus, the second magnetic layer portion can be formed with higher accuracy and the thickness of the first thin film coil can be increased, compared to a head where a thin film coil is located in a space defined by the thickness of the second magnetic layer portion. As a result, the second magnetic layer portion having a minute uniform width and the excellent overwriting characteristics can be formed.

According to the thin film magnetic head of one aspect of the invention, a part of the first insulating layer portion is located in the overlap area where the first magnetic layer portion and the third magnetic layer portion overlap each other. Thus, the leak of the magnetic flux from the top part area to the bottom part area is effectively suppressed with existence of the part of the first insulating layer portion, and the propagation loss of the magnetic flux in the propagation process is reduced.

Moreover, according to a thin film magnetic head and a method of manufacturing the same of another aspect of the invention, the recessed area is formed on an opposite side surface of the first insulating layer portion from the gap layer, and the first thin film coil is located on the recessed area That is, the level of the under layer surface where the first thin film coil is formed becomes lower. Thus, the thickness of the first thin film coil can be increased.

Moreover, according to the thin film magnetic head of a further aspect of the invention, the boundary surface between the second magnetic layer portion and the first insulating layer portion is a plane. Thus, the position of a front surface the first insulating layer portion, i.e. the zero throat height position, which is one of the factors which determine the performances of the recording head, can be determined uniquely unlike heads with an uneven boundary surface.

Moreover, according to the thin film magnetic head of a further aspect of the invention, the magnetic material of the second magnetic layer portion has the saturation magnetic flux density higher than that of the magnetic material of the first magnetic layer portion. Thus, even if the propagation of the magnetic flux in the first magnetic layer portion is disturbed, the smooth propagation of the magnetic flux can be secured in the second magnetic layer portion. Such an effect will contribute to securing the excellent overwriting characteristic.

Moreover, according to the method of manufacturing a thin film magnetic head of the invention, in the etching process, the first magnetic layer portion is formed using a reactive ion etching. Thus, the first magnetic layer portion is formed with high accuracy within a short time.

Moreover, according to the method of manufacturing a thin film magnetic head of another aspect of the invention, the etching process is performed in the gas atmosphere containing chlorine. The first magnetic layer portion is formed with higher within a shorter time.

Moreover, according to the method of manufacturing a thin film magnetic head of a still another aspect of the invention, the etching process is performed at a temperature within a range from 50° C. to 300° C. Thus, the first magnetic layer portion is formed with higher accuracy within a shorter time.

Obviously many modifications and variations of the present invention are possible in the light of the above teachings. It is therefore to be understood that within the scope of the appended claims the invention may be practiced otherwise than as specifically described.

What is claimed is:

1. A thin film magnetic head comprising:
   a first magnetic layer and a second magnetic layer magnetically coupled to each other and having two magnetic poles facing each other with a gap layer in between near and in a recording-medium-facing surface to be faced with a recording medium;
   a thin film coil provided between the first and second magnetic layers; and
   an insulating layer for insulating the thin film coil from the first and the second magnetic layers,
   the first magnetic layer including a laminate of a first magnetic layer portion and a second magnetic layer portion, the first magnetic layer portion being located away from the gap layer and the second magnetic layer portion being located close to the gap layer,
   the second magnetic layer portion extending adjacent to the gap layer from the recording-medium-facing surface to a first position, while maintaining a uniform width for defining a write track width on the recording medium,
   the first magnetic layer portion including a uniform width portion and a widened portion,
   the uniform width portion extending from the recording-medium-facing surface or its neighborhood to a second position located at or near the first position, while maintaining the same width as the uniform width of the second magnetic layer portion,
   the widened portion extending from the second position to a third position, and having a width greater than that of the uniform width portion,
   wherein the thin film coil comprises a first thin film coil, most of the first thin film being included in a space defined by a thickness of the uniform width portion in the first magnetic layer portion, and
   the insulating layer comprises a first insulating layer portion located in a space defined by a thickness of the second magnetic layer portion and being in contact with the first thin film coil.

2. A thin film magnetic head according to claim 1, wherein a thickness of the first magnetic layer portion is larger than a thickness of the first thin film coil.

3. A thin film magnetic head according to claim 1, wherein the thickness of the second magnetic layer portion is 1.0 microns or less.

4. A thin film magnetic head according to claim 1, wherein an approximal surface of the first insulating layer portion in contact with the first thin film coil is coplanar with a boundary surface between the first magnetic layer portion and the second magnetic layer portion.

5. A thin film magnetic head according to claim 1,
   wherein the third position in the first magnetic layer portion is located between the recording-medium-facing surface and the thin film coil,
   the insulating layer further comprises a second insulating layer portion covering the first thin film coil, and
   a first surface of the second insulating layer portion, the first surface being far from the first insulating layer portion is coplanar with a second surface of the first magnetic layer portion, the second surface being far from the second magnetic layer portion.

6. A thin film magnetic head according to claim 5, wherein the first magnetic layer further comprises a third magnetic layer portion partially overlapping and magnetically coupled to the first magnetic layer portion, and a part of the first insulating layer portion is located in an overlap area where the first magnetic layer portion and the third magnetic layer portion are overlapping each other.

7. A thin film magnetic head according to claim 6, wherein the thin film coil further comprises a second thin film coil electrically connected with the first thin film coil, the first magnetic layer further comprises a fourth magnetic layer portion for connecting magnetically the first magnetic layer portion with the third magnetic layer portion, and the second thin film coil is located in a manner that most of the second thin film is included in a space defined by a thickness of the fourth magnetic layer portion.

8. A thin film magnetic head according to claim 1, wherein a recessed area is provided on an opposite side surface of the first insulating layer portion from the gap layer, and the first thin film coil is located in the recessed area.

9. A thin film magnetic head according to claim 1, wherein the first insulating layer is in contact with the second magnetic layer portion at the first position.

10. A thin film magnetic head according to claim 9, wherein a boundary surface between the second magnetic layer portion and the first insulating layer portion is a plane.

11. A thin film magnetic head according to claim 10, wherein the boundary surface between the second magnetic layer portion and the first insulating layer portion is perpendicular to a direction in which the second magnetic layer portion extends.

12. A thin film magnetic head according to claim 1, wherein a magnetic material of the second magnetic layer portion has a saturation magnetic flux density equal to or higher than that of a magnetic material of the first magnetic layer portion.

13. A thin film magnetic head according to claim 12, wherein the first magnetic layer portion is made of a magnetic material containing iron, nickel and cobalt, and the second magnetic layer portion is made of a magnetic material containing either a nickel-iron alloy or a cobalt-iron alloy.

14. A thin film magnetic head according to claim 1, wherein at least one of the first magnetic layer portion, the second magnetic layer portion, and the second magnetic layer is made of a magnetic material containing iron nitride, a nickel-iron alloy or an amorphous alloy.

15. A thin film magnetic head according to claim 14, wherein the amorphous alloy is a cobalt-iron alloy, a zirconium-cobalt-iron alloy oxide, or a zirconium-iron alloy nitride.

16. A thin film magnetic head according to claim 1, wherein at least one of the first magnetic layer portion, the second magnetic layer portion, and the second magnetic layer consists of a magnetic material containing iron, nickel, and cobalt.

* * * * *